US012611868B2

(12) United States Patent
Chino

(10) Patent No.: US 12,611,868 B2
(45) Date of Patent: Apr. 28, 2026

(54) LIQUID EJECTING DEVICE

(71) Applicant: SEIKO EPSON CORPORATION, Tokyo (JP)

(72) Inventor: Hashiru Chino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 345 days.

(21) Appl. No.: 18/544,730

(22) Filed: Dec. 19, 2023

(65) Prior Publication Data

US 2024/0208224 A1 Jun. 27, 2024

(30) Foreign Application Priority Data

Dec. 23, 2022 (JP) ................................ 2022-206386

(51) Int. Cl.

| | |
|---|---|
| ***B41J 2/17*** | (2006.01) |
| ***B41J 3/407*** | (2006.01) |
| ***B41J 29/13*** | (2006.01) |
| ***B41J 29/17*** | (2006.01) |
| *D06P 5/30* | (2006.01) |

(52) U.S. Cl.

CPC ........... *B41J 2/1721* (2013.01); *B41J 3/4078* (2013.01); *B41J 29/13* (2013.01); *B41J 29/17* (2013.01); *D06P 5/30* (2013.01)

(58) Field of Classification Search

CPC ........ B41J 2/1721; B41J 3/4078; B41J 29/13; B41J 29/17; B41J 2/01; B41J 29/393; D06P 5/30

See application file for complete search history.

(56) References Cited

U.S. PATENT DOCUMENTS

2018/0229507 A1 8/2018 Koshiba et al.

FOREIGN PATENT DOCUMENTS

JP 2018-130911 A 8/2018

OTHER PUBLICATIONS https://dreamshop.honda.com/s/model-product/a26UT000002STJEYA4/a26ut000002stje (Year: 2016).*

* cited by examiner

*Primary Examiner* — Justin Seo

(74) *Attorney, Agent, or Firm* — WORKMAN NYDEGGER

(57) ABSTRACT

A liquid ejecting device includes: an ejecting unit configured to eject a liquid to a medium; a liquid receiving section including a liquid receiving groove opposed to the ejecting unit; and a roll body wound with a cover member having flexibility. The cover member is configured to be displaced, by being pulled out from the roll body, to a closed position to close an opening of the liquid receiving groove, and is configured to be displaced, by being wound around the roll body, to an open position to open the opening of the liquid receiving groove.

18 Claims, 9 Drawing Sheets

LIQUID EJECTING DEVICE

The present application is based on, and claims priority from JP Application Serial Number 2022-206386, filed on Dec. 23, 2022, the disclosure of which is hereby incorporated by reference herein in its entirety.

BACKGROUND

1. Technical Field

The present disclosure relates to a liquid ejecting device including an ejecting unit configured to eject a liquid such as ink to a medium.

2. Related Art

For example, JP-A-2018-130911 discloses a printing apparatus (one example of a liquid ejecting device) configured to eject a liquid such as ink toward a medium to perform printing on the medium.

This printing apparatus includes a groove-shaped ink receiving portion (one example of a liquid receiving groove) and a supporting member (one example of a cover member). The ink receiving portion is configured to receive ink permeating through to the back side of the medium and dripping down, of the ink ejected to the medium from a recording head (one example of an ejecting unit). The supporting member has flexibility and is configured to cover an opening of the ink receiving portion. The supporting member can be positioned in a switchable manner between a support position (one example of a closed position) at which the supporting member is disposed between the medium and the ink receiving portion in the vertical direction, and a retracting position (one example of an open position) at which the supporting member is retracted from the support position. The supporting member supports the medium in a state of being disposed at the support position.

However, in the printing apparatus described in JP-A-2018-130911, when the cover member such as the supporting member is disposed at the retracting position (open position), both end portions are disposed at positions close to each other, and hence, a portion between both end portions droops. As the cover member droops for a long period of time, deformation such as a fold may be created at the lower end portion of the drooping portion.

When deformation such as a fold is created at the cover member, both sides of a portion of the cover member that is recessed due to the deformation such as a fold are shaped in a raised manner and into a wavy shape when the cover member covers the liquid receiving groove. This raised portion causes the medium to be elevated. When the medium is elevated, this leads to a problem in which inconvenience occurs such that the printing position is shifted on the medium or the medium comes into contact with the recording head. Thus, there is a demand for a liquid ejecting device that is less likely to cause deformation such as a fold to occur in the cover member even when the cover member is repeatedly switched between the closed position and the open position.

SUMMARY

A liquid ejecting device that solves the problem described above includes an ejecting unit configured to eject a liquid to a medium, a liquid receiving section including a liquid receiving groove opposed to the ejecting unit, and a roll body wound with a cover member having flexibility, in which the cover member is configured to be displaced, by being pulled out from the roll body, to a closed position to close an opening of the liquid receiving groove, and is configured to be displaced, by being wound around the roll body, to an open position to open the opening of the liquid receiving groove.

BRIEF DESCRIPTION OF THE DRAWINGS

FIG. 18 is a schematic cross-sectional view illustrating a liquid receiving section and a cover unit according to another modification example different from that in

FIG. 17.

DESCRIPTION OF EMBODIMENTS

Below, an embodiment of a liquid ejecting device will be described with reference to the drawings.

Figure 1:
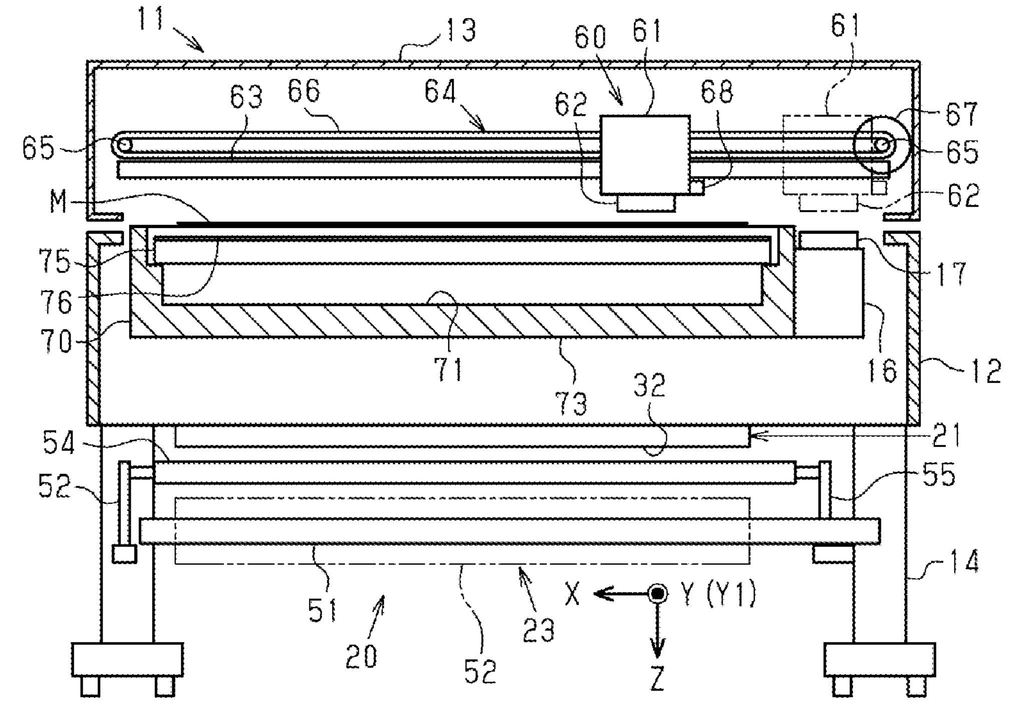
FIG. 1 is a front cross-sectional view schematically illustrating a liquid ejecting device according to an embodiment.
Figure 2:
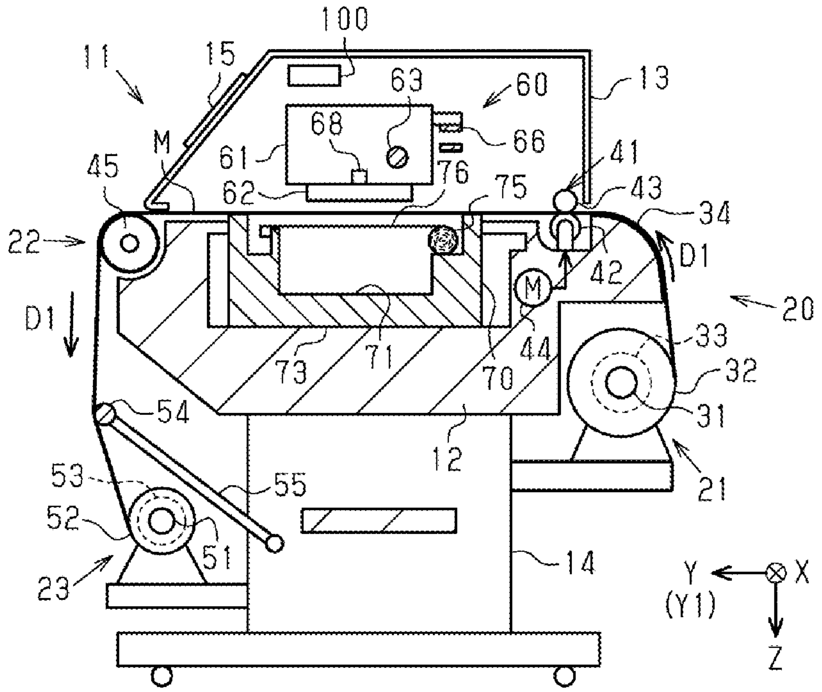
FIG. 2 is a side cross-sectional view schematically illustrating the liquid ejecting device.

In FIGS. 1 and 2, on the assumption that a liquid ejecting device 11 is disposed on a horizontal plane, the direction of gravity is indicated as the Z-axis, and directions along the horizontal plane are indicated as the X-axis and the Y-axis. The X-axis, the Y-axis, and the Z-axis are perpendicular to each other. In the following description, the direction along the X-axis is also referred to as a scanning direction X because this direction is a direction in which an ejecting unit 62 described later is caused to scan. In addition, the direction along the Z-axis is also referred to as a vertical direction Z. The direction along the Y-axis is a transport direction in which a medium M is transported at a printing position at which printing is performed on the medium M, and hence, is also referred to as a transport direction Y1. In addition, the direction along the X-axis is the width direction of the medium M, and hence, is also referred to as a width direction X.

Configuration of Liquid Ejecting Device 11

As illustrated in FIGS. 1 and 2, the liquid ejecting device 11 includes the ejecting unit 62 configured to eject ink serving as one example of a liquid on the medium M. The liquid ejecting device 11 is an ink-jet printing apparatus configured such that the ejecting unit 62 ejects ink to the medium M to perform printing on the medium M. The liquid ejecting device 11 is, for example, a textile printing device configured to perform printing on the medium M such as a long fabric. The textile printing device is, for example, a digital-type textile printing device in which the ejecting unit 62 ejects ink to the medium M such as a fabric based on print data. The liquid ejecting device 11 includes a support portion 70 configured to support the medium M. In addition, the liquid ejecting device 11 includes a liquid receiving section 73 including a liquid receiving groove 71 opposed to the ejecting unit 62. In the example illustrated in FIGS. 1 and 2, the liquid receiving section 73 is configured as a portion of the support portion 70. In other words, the liquid ejecting device 11 according to the present embodiment is a gutter-platen type textile printing device in which the support portion 70 (platen) includes the liquid receiving groove 71. Note that the liquid receiving section 73 May be constituted by a member other than the support portion 70.

The liquid receiving section 73 includes a liquid receiving groove 71 provided at a portion opposed to the ejecting unit 62. That is, the liquid receiving section 73 includes the liquid receiving groove 71 provided below a printing region that is a region in which the ejecting unit 62 moves in the scanning direction X at the time of printing. Of ink ejected from the ejecting unit 62 and landing on the medium M, the liquid receiving groove 71 receives a liquid such as ink that has permeated through the medium to the back surface side of the medium M and then dripped down. When the medium M is a thin fabric or a fabric with a relatively large gap between fibers, the ink is more likely to permeate through to the back surface side of the medium M. In addition, even if the medium M is of the same type, when the amount of ink ejected per unit area of the medium M is large, the ink is more likely to pass through to the back surface side of the medium M. The liquid receiving groove 71 includes an opening slightly larger than the printing region of the ejecting unit 62 in the scanning direction X and the transport direction Y1. Thus, from among the ink ejected from the ejecting unit 62 toward the medium M, ink landing on the front surface of the medium M and then passing through to the back surface side and ink ejected outside of the medium M without landing on the medium M are stored in the liquid receiving groove 71.

The liquid ejecting device 11 May include a base 12 having a column and beam structure, and a housing 13 supported by the base 12, as illustrated in FIGS. 1 and 2. The liquid ejecting device 11 includes a transport device 20 configured to transport the medium M, and a printing unit 60 configured to perform printing on the medium M. The transport device 20 and the printing unit 60 are supported by the base 12. The base 12 is supported by the leg portion 14 at the floor surface. The housing 13 covers a scanning region that is a region where a carriage 61 and the ejecting unit 62 move in the scanning direction X at the time of printing.

As illustrated in FIG. 2, the transport device 20 transports the medium M in the transport direction D1 indicated by the arrow in FIG. 2. The direction (direction perpendicular to the paper surface in FIG. 1) perpendicular to the transport direction D1 of the medium M is the width direction X. The width direction X is also the scanning direction X in which the carriage 61 moves. In the present embodiment, the scanning direction X and the transport direction Y are directions intersecting each other (for example, perpendicular to each other), and each intersects (for example, are each perpendicular to) the vertical direction Z. Note that the transport direction D1 of the medium M changes depending on positions on the transport path as indicated by the arrow with the solid line in FIG. 2.

As illustrated in FIG. 2, the transport device 20 includes a feeding unit 21, a transport unit 22, and a winding unit 23. The feeding unit 21 feeds the medium M from a first roll 32. The feeding unit 21 includes a roll-body supporting shaft 31 configured to rotatably support the first roll 32 in which the medium M is wound in a roll form, and a feed motor 33 configured to output power for rotating the first roll 32 in a forward and rearward direction. For example, the medium M fed from the feeding unit 21 is guided by an arc-surface shaped guide plate 34, and is fed to the transport unit 22.

The transport unit 22 transports, along the transport direction Y1, the medium M fed from the feeding unit 21. The transport unit 22 includes a transport roller pair 41 and a guide roller 45 disposed at positions upstream and downstream, respectively, with the support portion 70 interposed therebetween in the transport direction Y1. Specifically, the transport roller pair 41 is disposed at a position upstream of the support portion 70 in the transport direction Y1. The guide roller 45 is disposed at a position downstream of the support portion 70 in the transport direction Y.

The transport roller pair 41 transports, in the transport direction Y1, the medium M fed from the feeding unit 21. A driving roller 42 and a driven roller 43 form a pair to configure the transport roller pair 41. The driven roller 43 is biased in a direction toward the driving roller 42. The transport unit 22 includes a transport motor 44 serving as a driving source for the transport roller pair 41. As the driving roller 42 rotates with the power of the transport motor 44, the medium M is sent downstream in the transport direction Y1 in a state of being nipped (interposed) by the transport roller pair 41.

The guide roller 45 includes an upper end located at substantially the same height as the nipping position of the transport roller pair 41. The medium M is nipped by the transport roller pair 41, passes through the outer peripheral surface of the guide roller 45, and is would by the winding unit 23. The control unit 100 performs velocity control of the transport motor 44 to control the rotational speed of the transport roller pair 41. In addition, the control unit 100 also controls the winding speed at which the winding unit 23 winds the medium M. Thus, predetermined tension is applied to a portion of the medium M that is disposed between the transport roller pair 41 and the guide roller 45. With this tension, the medium M is kept in a state of extending in a substantially horizontal manner between the transport roller pair 41 and the guide roller 45. The guide roller 45 guides, to the winding unit 23, the medium M after printing. Note that the transport unit 22 May include one or a plurality of other rollers provided along the transport path.

The winding unit 23 winds the medium M after printing. The medium M fed from the feeding unit 21 is transported by the transport unit 22. In the process in which the medium M passes through the printing position located above the liquid receiving groove 71, an image or the like is printed on the medium M with ink droplets ejected from the ejecting unit 62.

The winding unit 23 includes a rotation supporting shaft 51 configured to rotatably support the second roll 52, and a winding motor 53 serving as a driving source of the winding unit 23. With the winding motor 53 being driven, the second roll 52 winds the medium M after printing. A tension bar 54 configured to come into contact with the medium M and apply tension to the medium M is disposed between the guide roller 45 and the winding unit 23. The winding unit 23 winds, around the second roll 52, the medium M to which tension is applied by the tension bar 54. Note that the tension bar 54 is supported by a pair of arms 55. In each of the pair of arms 55, a top end is coupled to a corresponding end portion of the tension bar 54 in the width direction X, and a base end portion is supported rotatably relative to the leg portion 14.

As illustrated in FIGS. 1 and 2, the printing unit 60 includes the ejecting unit 62 described above. The liquid ejecting device 11 according to the present example is of a serial-printing type. In a case of the serial-printing type, the printing unit 60 includes the carriage 61 on which the ejecting unit 62 is mounted. The carriage 61 reciprocates in the scanning direction X intersecting the transport direction Y of the medium M. When the carriage 61 reciprocates in the scanning direction X, the printing unit 60 ejects ink from the ejecting unit 62 toward the medium M in at least one of forward movement and backward movement of the reciprocating carriage 61.

The ejecting unit 62 is mounted on the carriage 61 in a posture in which the ejecting unit 62 is opposed to the support portion 70. The ejecting unit 62 ejects a liquid toward the medium M supported by the support portion 70.

In addition to the carriage 61 and the ejecting unit 62, the printing unit 60 includes: a guide shaft 63 configured to guide the carriage 61 along a scanning path; a carriage motor 67 serving as a driving source for the carriage 61; and a power transmission mechanism 64 configured to transmit power of the carriage motor 67 to the carriage 61. The power transmission mechanism 64 is, for example, a belt-type power transmission mechanism. Specifically, the power transmission mechanism 64 includes a pair of pulleys 65 (see FIG. 1), and a timing belt 66 looped around the pair of pulleys 65. One of the pulleys 65 is coupled to the output shaft of the carriage motor 67. The carriage 61 is fixed at a portion of the timing belt 66.

The carriage 61 is configured to reciprocate along the guide shaft 63 in the scanning direction X with driving of the carriage motor 67. The ejecting unit 62 performs printing on the medium M supported by the support portion 70 in the process in which the carriage 61 moves in the scanning direction X. In a case of the serial-printing type, a printing operation and a transport operation are alternatively performed to print a character or an image on the medium M. In the printing operation, the ejecting unit 62 ejects a liquid in the process of moving, thereby performing printing for one line (one scanning). In the transport operation, the transport device 20 transports the medium M to the next printing position.

The liquid ejecting device 11 includes a maintenance device 16 configured to perform maintenance of the ejecting unit 62. The maintenance device 16 is disposed at a position opposed to the ejecting unit 62 disposed at a home position indicated by the long dashed double-short dashed line in FIG. 1, the home position being a stand-by position when printing is not performed. The maintenance device 16 includes a cap 17 configured to move between a capping position at which the device is brought into contact with a nozzle surface 62A (see FIG. 3) of the ejecting unit 62 and a retracting position (illustrated in FIG. 1) spaced apart from the nozzle surface 62A.

The liquid ejecting device 11 includes a liquid supply unit (not illustrated) configured to supply the ejecting unit 62 with a liquid such as ink. The ejecting unit 62 includes a nozzle 62N (see FIG. 3) configured to eject the liquid such as ink supplied from the liquid supply unit. A liquid accommodation unit is constituted by, for example, a liquid cartridge mounted by a user in a detachable state, or a liquid tank that a user refills with a liquid such as ink. The carriage 61 is coupled to the liquid supply unit through a tube (not illustrated). The liquid such as ink is supplied to the ejecting unit 62 through a tube. For example, the liquid supply unit supplies the ejecting unit 62, through corresponding tubes, with a plurality of colors of ink including cyan, magenta, yellow, and black for forming a color. Note that the ejecting unit 62 is also referred to as a printing head.

A cover unit 75 including a cover member 76 configured to open and close an opening of the liquid receiving groove 71 is attached to the support portion 70. The cover unit 75 is of a winding type configured to wind up the cover member 76. Detailed configuration of this cover unit 75 will be described later.

The liquid ejecting device 11 includes a control unit 100 (see FIG. 2) configured to control the transport device 20 and the printing unit 60 illustrated in FIG. 1. The liquid ejecting device 11 includes a display unit 15 serving as one example of a notification unit. A menu and various types of messages or the like that let a user know the state of the liquid ejecting device 11 are displayed on the display unit 15. The display unit 15 according to the present example is also used to display a message or the like that prompts maintenance in accordance with the degree of contamination of the cover member 76. Note that the notification unit is not limited to the display unit 15. For example, the notification unit may be configured to cause a sound to be generated from a sound generating unit to notify a user of various types of information, or may be configured to perform communication from a serve device to a communication terminal device such as a smartphone to notify a user of various types of information.

As illustrated in FIGS. 1 and 2, the liquid ejecting device 11 includes a detector 68 configured to detect a state of the front surface of the cover member 76. Based on a detection result by the detector 68, the control unit 100 causes the display unit 15 to make a notification of the state of the front surface of the cover member 76.

The detector 68 is provided, for example, at the carriage 61 as illustrated in FIGS. 1 and 2. The detector 68 is, for example, a camera or a sensor. The sensor may be an image sensor. When the detector 68 is a camera or an image sensor, the detector 68 takes an image of the front surface of the cover member 76 pulled out and brought into a close state in which the opening of the liquid receiving groove 71 is covered. That is, in a state in which the medium M does not exist above the cover member 76 in the close state, an image of the front surface of the cover member 76 is taken by the detector 68 while the carriage 61 is being moved in the scanning direction X. At this time, image pick-up is performed to the entire region of the front surface of the cover member 76 in the scanning direction X or a representative region of the half or more of the entire region. The representative region may be, for example, a region that is a portion of the cover member 76 in the width direction X including the central portion thereof. The central portion is a region through which a plurality of types of the media M having different width sizes pass in common, and is a region in which the frequency of ejection of ink is high. When contamination exceeding a certain threshold value is detected in the representative region, the control unit 100 determines that a maintenance timing for the cover member 76 has arrived. This maintenance timing may include at least one of a cleaning timing or a replacement timing. The threshold value that defines the cleaning timing is assumed to be a first threshold value. When the degree of contamination exceeds a second threshold value greater than the first threshold value, or when the degree of contamination exceeds the first threshold value even after cleaning is performed, a replacement timing for the cover member 76 or the cover unit 75 has arrived.

The control unit 100 may acquire data of an image obtained from the detector 68. The control unit 100 may perform image analysis processing based on the image data to determine the degree of contamination of the cover member 76. When the degree of contamination exceeds the first threshold value, the control unit 100 may display, on the display unit 15, a message or the like that prompts maintenance such as cleaning. When the degree of contamination does not fall below the second threshold value even after cleaning is performed (that is, when the degree of contamination exceeds the second threshold value), the control unit 100 may display, on the display unit 15, a message or the like that prompts replacement of the cover member 76 or the cover unit 75. Note that the first threshold value is a value indicating the degree of contamination greater than the second threshold value.

The printing type of the liquid ejecting device 11 is not limited to the serial-printing type, and may be a line-printing type. In a case of the line-printing type, the ejecting unit 62 is constituted by a line head including nozzles 62N, and the number of the nozzles 62N being set so that a liquid can be ejected at the same time over the entire region, in the width direction, of the medium M transported by the transport device 20. The ejecting unit 62 of the line-printing type ejects a liquid at the same time over the entire region in the width direction of the medium M and toward the medium M transported by the transport device 20 at a predetermined transport velocity, thereby printing an image or the like on the medium M.

First Embodiment

Next, the support portion 70 and the cover unit 75 according to a first embodiment will be described in detail with reference to FIGS. 3 and 4.

Figure 3:
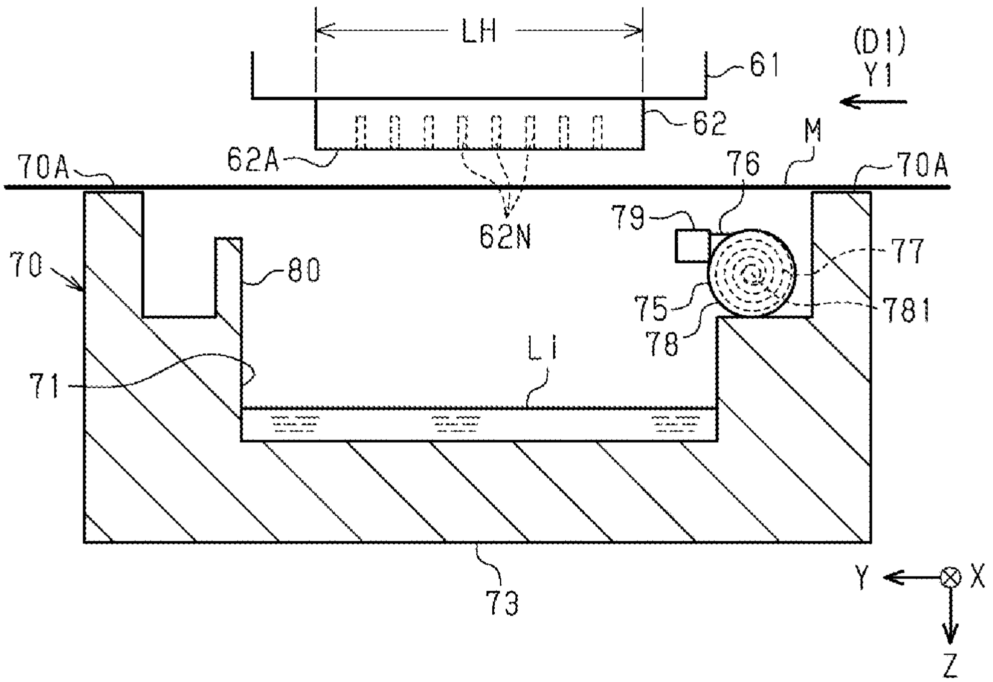
FIG. 3 is a side cross-sectional view schematically illustrating an ejecting unit, a support portion, and a cover unit according to a first embodiment.
Figure 4:
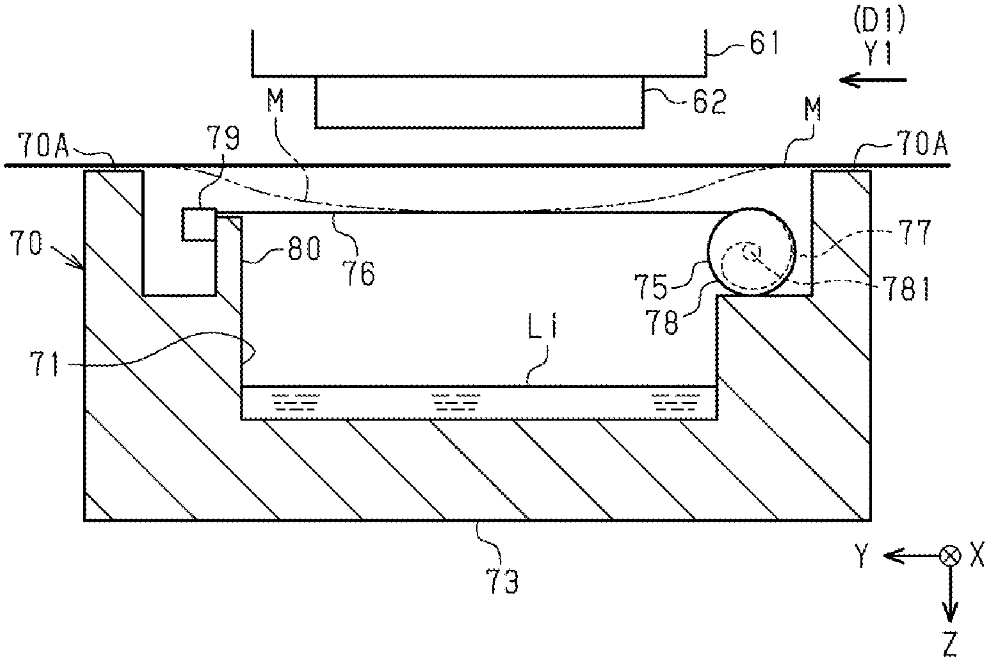
FIG. 4 is a side cross-sectional view schematically illustrating the cover member in a state of being at a closed position.

As illustrated in FIGS. 3 and 4, the support portion 70 is disposed at a position opposed to the ejecting unit 62. The support portion 70 includes a support face 70A (see FIG. 3) configured to support the medium M. The medium M transported above the support portion 70 is supported by the support face 70A.

The ejecting unit 62 ejects a liquid such as ink to the medium M supported by the support face 70A of the support portion 70 to print an image on the medium M. The medium M is, for example, a fabric. When the medium M is a fabric, the liquid such as ink ejected toward the medium M is more likely to pass through gaps between fibers of the fabric, and permeate through to the back surface side of the medium M. For example, when the support portion (platen) is of a type having a support face configured to support, from the back surface, a portion of the printing region of the medium M on which ink is ejected, the liquid such as ink permeating through to the back surface of the medium M makes the support face contaminated. In this case, the back surface of the medium M that is supported by the support face is made contaminated with the liquid such as ink.

Thus, the present embodiment employs the support portion 70 of the gutter-platen type including the liquid receiving groove 71 provided at a portion corresponding to the printing region to which ink is ejected. The opening of the liquid receiving groove 71 is located at a position opposed to the movement region when the ejecting unit 62 performs printing, and has an area including a liquid ejection region to which a liquid is ejected from the ejecting unit 62. In the example illustrated in FIG. 3, the liquid receiving groove 71 includes an opening having an area extending over a region longer than the dimension LH of the ejecting unit 62 in the transport direction Y1. Of ink landing on the medium M at the time of printing, a waste liquid Li such as waste ink that permeates through the medium M to the back surface side of the medium and then drips down is stored in the liquid receiving groove 71.

As illustrated in FIGS. 3 and 4, the liquid ejecting device 11 includes a holding unit 78 rotatably holding a roll body 77 wound with the cover member 76 having flexibility. The holding unit 78 is disposed at an inner wall of the liquid receiving groove 71 of the support portion 70. In the example illustrated in FIGS. 3 and 4, a portion of the inner wall portion of the support portion 70 that is upstream in the transport direction Y1 includes a step portion having a step shape, and the holding unit 78 is fixed at the upper surface of the step portion. The upper end of the holding unit 78 is located below the support face 70A in the vertical direction Z. In addition, an upper portion of the holding unit 78 is opened.

As illustrated in FIGS. 3 and 4, the cover member 76 is configured to be displaced, by being pulled out from the roll body 77, to a closed position to close the opening of the liquid receiving groove 71, and is configured to be displaced, by being wound around the roll body 77, to an open position to open the opening of the liquid receiving groove 71. That is, as illustrated in FIG. 4, the cover member 76 is configured to be displaced, by being pulled out from the roll body 77, to the closed position to close the opening of the liquid receiving groove 71. In addition, as illustrated in FIG. 3, the cover member 76 is configured to be displaced, by being wound around the roll body 77, to the open position to open the opening of the liquid receiving groove 71.

The cover member 76 may be a member having flexibility. For example, the cover member 76 is constituted by a roll screen, mesh, or the like. The material of the cover member 76 may be a metal or synthetic resin used in a resin fiber, provided that the member is in a form of a wire or the like that has flexibility. In addition, the structure is not limited to the mesh or net structure, and a sheet made of synthetic resin may be used. The cover unit 75 includes a rod-shaped handle 79 fixed at the tip portion of the cover member 76. The support portion 70 includes an engagement target portion 80 configured to engage with the handle 79 by hooking the handle 79 on it for the purpose of holding the cover member 76 at the time of pulling it out. The engagement target portion 80 is disposed at a position downstream of the liquid receiving groove 71 in the transport direction Y1.

The ink permeating through to the back surface of the medium M, for example, drops down, and is stored in the liquid receiving groove 71 as the waste liquid Li. The medium M is not supported at a portion corresponding to the opening of the liquid receiving groove 71. Thus, the medium M is transported in a state of being slightly lifted away from the upper surface of the support portion 70. When tension is not applied, the medium M that is not supported at the back surface thereof droops. When the medium M droops, droplets of ink or the like ejected from the ejecting unit 62 do not land at desired locations, which results in positional shift of dots. Thus, tension is applied to the medium M during transport such that the medium M does not droop. In addition, with this tension, the medium M is transported while the substantially horizontal posture is being kept in a state in which the medium M is slightly lifted upward from the surface of the opening of the support portion 70. At this time, a feeding operation by the transport roller pair 41 and a winding operation by the winding unit 23 are controlled, and a tension applying function of the tension bar 54 is utilized, whereby the tension is adjusted at an appropriate value.

Note that the cover member 76 that has been pulled out is disposed at the same height as the opening surface of the support portion 70 or at a height slightly lower than the opening surface. Thus, the medium M is transported in a state of being slightly lifted upward away from the upper surface of the cover member 76. In FIGS. 2 to 4 or the like, the gap between the cover member 76 and the medium M is illustrated in a slightly exaggerated manner. However, the gap falls, for example, within a range of 0.1 mm to 5 mm. Thus, even when the relatively heavy medium M slightly droops, the medium M is supported by the cover member 76. In addition, the gap between the medium M and the nozzle surface 62A of the ejecting unit 62 falls, for example, within a range of 0.1 mm to 5 mm. The narrower the gap, the higher the accuracy of printing location. However, the gap is set to a gap value necessary to avoid contact between the medium M and the nozzle surface 62A of the ejecting unit 62.

Figure 5:
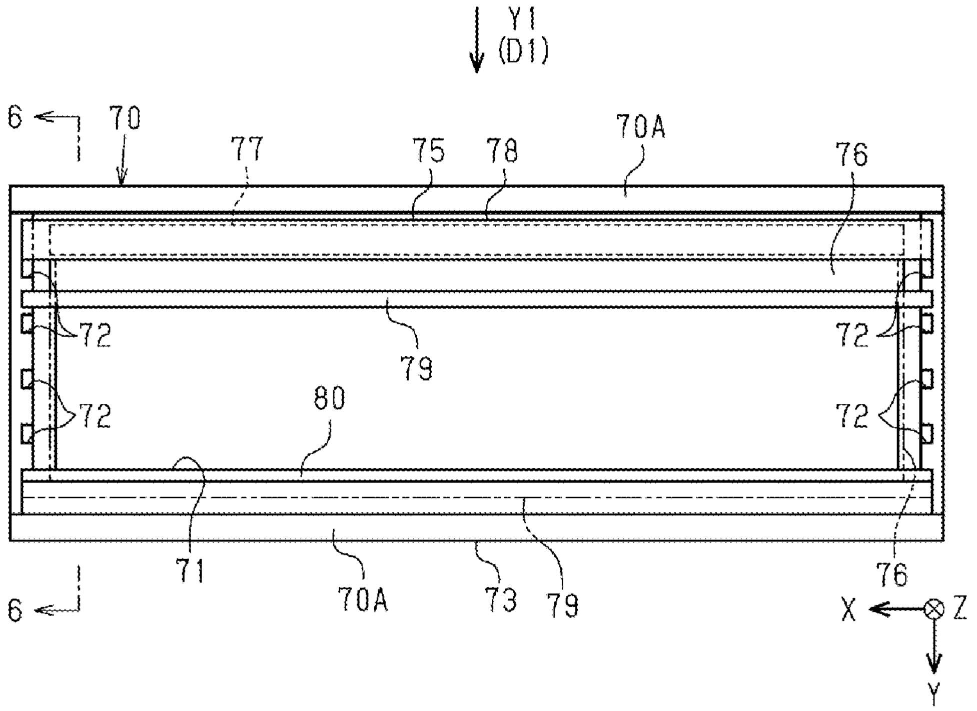
FIG. 5 is a schematic plan view illustrating a support portion and a cover unit with which the closed position of the cover member can be set in a plurality of stages.
Figure 6:
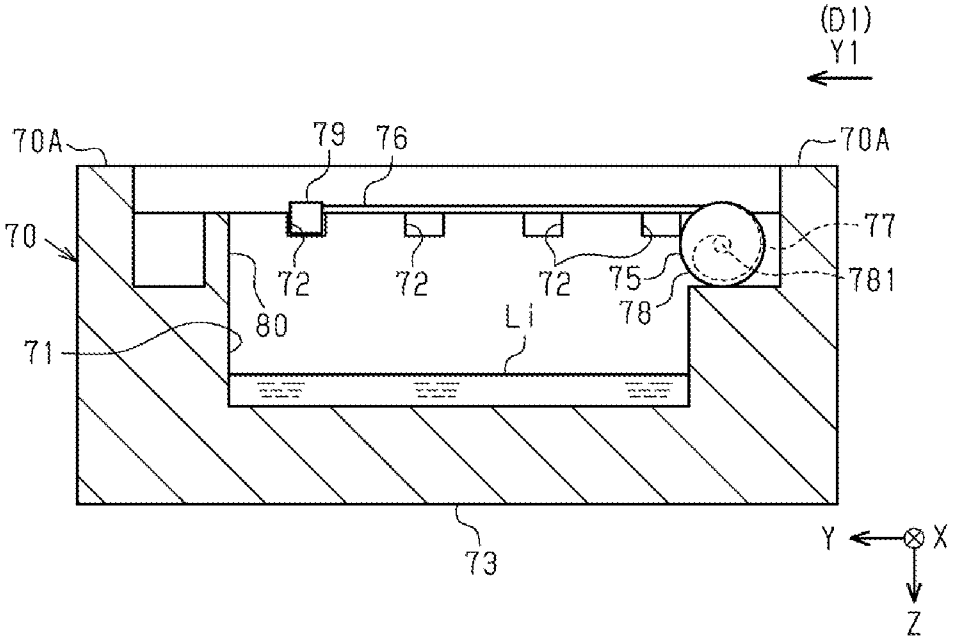
FIG. 6 is a side cross-sectional view schematically illustrating the cover member in a state of being at a closed position.

As illustrated in FIGS. 5 and 6, the amount of pulling out of the cover member 76 may be adjustable. As illustrated in FIG. 5, a recessed portion 72 used to hook each of both end portions of the handle 79 of the cover member 76 is provided at each of both end portions, in the width direction X, of the support portion 70. In the example illustrated in FIGS. 5 and 6, there are four recessed portions 72 between the holding unit 78 and the engagement target portion 80. By hooking the handle 79 on one of the four recessed portion 72 and the engagement target portion 80 selected by a user, it is possible to adjust the amount of closing by which the opening of the cover member 76 is covered. In this example, depending on positions at which the handle 79 is hooked, it is possible to select one of a state in which the cover member 76 covers approximately ¼ of the opening area of the liquid receiving groove 71, a state in which the cover member 76 covers approximately ½ of the opening area of the liquid receiving groove 71, a state in which the cover member 76 covers approximately ¾ of the opening area of the liquid receiving groove 71, and a state in which the cover member 76 covers approximately whole of the opening area of the liquid receiving groove 71. That is, the closed position is not limited to a position at which the entire opening of the liquid receiving groove 71 is closed by the cover member 76 but also includes a position at which a portion of the opening of the liquid receiving groove 71 is closed by the cover member 76.

The height positions of the recessed portions 72 and the engagement target portion 80 are set such that the cover member 76 is located horizontally in a state in which the handle 79 is hooked, and the cover member 76 is disposed at a position lower than the support face 70A. Thus, as illustrated in FIG. 6, the cover member 76 at the closed position is located below the back surface of the medium M supported by the support face 70A.

Figure 7:
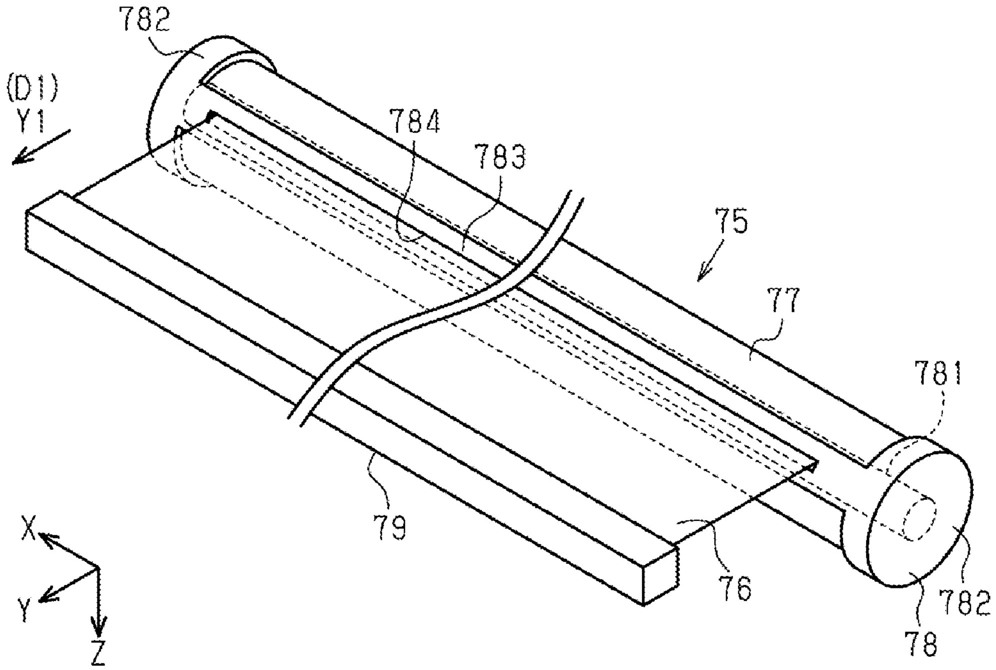
FIG. 7 is a partially exploded perspective view illustrating a cover unit.

As illustrated in FIG. 7, the holding unit 78 includes a rotary shaft 781, and a pair of tubular-shaped guiding portions 782 configured to rotatably support the rotary shaft 781. The holding unit 78 includes an extending portion 783 provided in a state of extending in the width direction X between the pair of guiding portions 782. The extending portion 783 is formed so as to be slightly longer than the length of the roll body 77 in the width direction X. The extending portion 783 includes a drawing slit 784 through which the cover member 76 is pulled out. The handle 79 is fixed at the tip portion of the cover member 76 in a state in which the cover member 76 passes through the drawing slit 784. The handle 79 is larger in size than the opening of the drawing slit 784. Thus, the extending portion 783 functions as a stopper at the winding direction side for the handle 79.

The extending portion 783 covers a portion, in the circumferential direction, of the roll body 77. Thus, the entire region, in the width direction X, of the other portion of the roll body 77 in the circumferential direction is exposed to the outside. Note that, when the outer peripheral surface of the roll body 77 does not need to be exposed, the holding unit 78 may include a tubular-shaped housing covering the entire circumference of the roll body 77 except for the portion of the drawing slit 784, instead of the extending portion 783.

In addition, the holding unit 78 is configured such that a spring (not illustrated) is accommodated within the guiding portion 782. This spring biases the cover member 76 in a winding direction. Thus, a user holds the handle 79 to pull out the cover member 76 from the roll body 77 by resisting the biasing force of the spring. In addition, when the user returns the cover member 76 into the open position, the cover member 76 is wound up into the roll body 77 with the biasing force of the spring. Note that the spring may be a mainspring or a torsion coil spring or the like.

Operation

Next, description will be made of operation of the cover unit 75 of the liquid ejecting device 11.

From the open position at which the cover member 76 is wound around the roll body 77 as illustrated in FIG. 3, the cover member 76 is pulled out from the roll body 77 as illustrated in FIG. 4 to be disposed at the closed position at which the opening of the liquid receiving groove 71 is closed. In this manner, in a state in which the cover member 76 is disposed at the closed position, a user sets the medium M at the liquid ejecting device 11. No tension is applied to the medium M during the setting operation. This leads to a possibility that a portion of the medium M that corresponds to the opening of the support portion 70 droops. However, the drooping portion of the medium M is supported by the cover member 76. Thus, even when the medium M gets slack and droops during the setting operation, the drooping portion does not fall into the liquid receiving groove 71. During the setting operation, this make it possible to prevent the medium M from being contaminated with the waste liquid Li such as waste ink within the liquid receiving groove 71.

Once the medium M is set, printing to the medium M starts. Since tension is applied to the medium M during printing, the medium M supported by the support face 70A is transported in a state of being slightly lifted upward away from the upper surface of the cover member 76. In addition, when the medium M is of a type in which ink is more likely to permeate through to the back surface of the medium M or when a printing condition in which ink is more likely to permeate through to the back surface of the medium M is employed, a user winds up the cover member 76 into the roll body 77 after the setting operation ends, in order to prevent the cover member 76 from being excessively contaminated with the ink. In this case, printing is performed on the medium M in an open state in which the cover member 76 does not close the opening of the liquid receiving groove 71. In other words, printing is performed on the medium M in a state in which the opening of the liquid receiving groove 71 is opened.

The serial-printing type liquid ejecting device 11 is configured such that a printing operation for one line (one scanning) and a transport operation are alternatively performed to print a character or an image on the medium M. In the printing operation, the ejecting unit 62 ejects ink in the process of moving. In the transport operation, the transport device 20 transports the medium M to the next printing position. For example, when the medium M is of a type in which ink is more likely to permeate through to the back surface of the medium M or when a printing condition in which ink is more likely to permeate through to the back surface of the medium M is employed, it is possible to prevent the cover member 76 from being excessively contaminated with the ink because the cover member 76 is in the open state. After printing, the ink permeating through to the back surface of the medium M is collected into the liquid receiving groove 71.

For example, when the medium M is of a type in which ink is less likely to permeate through to the back surface of the medium M or when a printing condition in which ink is less likely to permeate through to the back surface of the medium M is employed, printing is performed on the medium M with the cover member 76 being set at the closed position. The cover member 76 is disposed at a position spaced apart from and disposed below the medium M to which tension is applied, by a distance that falls, for example, within a range of 0.1 mm to 5 mm. Even when the medium M slightly droops during printing, the medium M is supported by the cover member 76. This makes it possible to suppress a reduction in the accuracy of printing location due to drooping of the portion of the medium M that corresponds to the printing region.

When the cover member 76 is disposed at the closed position during printing, once printing ends, a user detaches the handle 79, for example, from the engagement target portion 80, and winds up the cover member 76 into the roll body 77. The operation of winding the cover member 76 is performed with the rotary shaft 781 rotating using the biasing force of the spring such as a mainspring within the holding unit 78. With this winding operation, the cover member 76 is switched from the closed position to the open position. When at the open position, the cover member 76 is held in a state of being wound around the roll body 77. This makes it less likely to cause deformation such as a fold to occur in the cover member 76.

Notification Prompting Maintenance of Cover Member 76

In a state in which no medium M exists above the cover member 76 in the close state, the liquid ejecting device 11 captures an image of the front surface of the cover member 76 using the detector 68 while moving the carriage 61 in the scanning direction X. Based on a detection result by the detector 68, the control unit 100 causes the display unit 15 to make a notification of the state of the front surface of the cover member 76. Specifically, when the degree of contamination detected by the detector 68 exceeds the first threshold value, the control unit 100 causes the display unit 15 to display information (for example, a message) indicating that a cleaning timing has arrived, thereby making a notification of prompting a user to perform cleaning. Furthermore, when the degree of contamination detected by the detector 68 exceeds the second threshold value or when the degree of contamination exceeds the first threshold value even after cleaning is performed, a replacement timing for the cover member 76 or the cover unit 75 has arrived. In this case, the control unit 100 causes the display unit 15 to display information (for example, a message) indicating that a replacement timing has arrived, thereby notifying a user that a replacement timing arrives.

Thus, with the first embodiment, it is possible to obtain the following effects.

(1) The liquid ejecting device 11 includes: the ejecting unit 62 configured to eject ink to the medium M; the liquid receiving section 73 including the liquid receiving groove 71 opposed to the ejecting unit 62; and the holding unit 78 configured to rotatably hold the roll body 77 wound with the cover member 76 having flexibility. The cover member 76 is configured to be displaced, by being pulled out from the roll body 77, to a closed position to close the opening of the liquid receiving groove 71, and is configured to be displaced, by being wound around the roll body 77, to an open position to open the opening of the liquid receiving groove 71. In a case of the configuration in which the cover member 76 at the open position droops with its own weight, deformation such as a fold is more likely to occur in the lower end portion of the cover member 76 that droops. With this configuration, the cover member 76 that is disposed at the open position is wound into a roll form. This makes it possible to suppress occurrence of deformation such as a fold at the cover member 76, as compared with the configuration in which the cover member 76 droops with its own weight.

(2) The liquid ejecting device 11 includes: the detector 68 configured to detect a state of the front surface of the cover member 76; the display unit 15 serving as one example of a notification unit; and the control unit 100 configured to cause the display unit 15 to make a notification of the state of the front surface of the cover member 76 based on a detection result by the detector 68. In a case of this configuration, a problem that can occur in a winding-type cover member 76 includes accumulation of dirt due to the cover member 76 being wound up in a state in which ink is attached and the cover member 76 is contaminated. The detector 68 configured to detect a state of the front surface of the cover member 76 is provided, and when it is found based on a result of detection that dirt is accumulated, the display unit 15 is caused to make a notification of the accumulation of dirt, which makes it possible to prompt a user to perform maintenance (cleaning, replacement, or the like).

Second Embodiment

Next, with reference to FIG. 8, description will be made of a second embodiment of the support portion 70 and the cover unit 75. Note that, in the second embodiment and each of the embodiments described below, the configurations of the support portion 70 and the cover unit 75 differ from those in the first embodiment described above, but other basic configurations of the liquid ejecting device 11 are similar to those in the embodiment described above.

Figure 8:
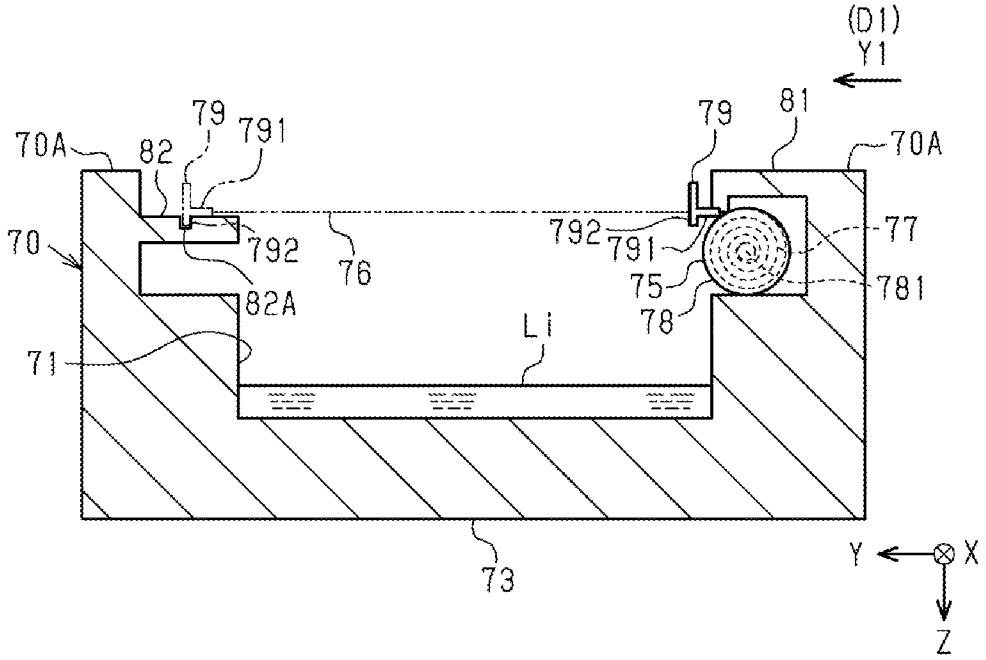
FIG. 8 is a side cross-sectional view schematically illustrating a support portion and a cover unit according to a second embodiment.

The support portion 70 illustrated in FIG. 8 includes a covering portion 81 configured to cover the upper side of the roll body 77 and the holding unit 78 that constitute the cover unit 75. The handle 79 includes a stopping portion 791 horizontally extending toward the upstream in the transport direction Y1, and also includes an engagement portion 792 extending downward in the vertical direction Z, in a state illustrated in FIG. 8. In a state in which the cover member 76 is at the open position, the stopping portion 791 of the handle 79 is stopped at a tip portion, in the transport direction Y1, of the covering portion 81. In addition, in a state in which the cover member 76 is at the closed position, the engagement portion 792 of the handle 79 is engaged with an engagement target portion 82A having a recessed shape and formed at the upper surface of an extending portion 82.

In this second embodiment, the roll body 77 and the holding unit 78 are covered with the covering portion 81 of the support portion 70. This configuration makes it possible to suppress attachment, on the roll body 77 and the holding unit 78, of droplets of ink that is not used in printing on the medium M and floats or spreads, from among the ink ejected from the nozzle 62N of the ejecting unit 62 during printing. For example, if ink is attached on the roll body 77, when the cover member 76 is pulled out after this and is used, the cover member 76 is contaminated with ink. In this case, at the time of performing the setting operation for the medium M or at the time of printing performed in a state in which the cover member 76 is disposed at the closed position, it is possible to prevent the medium M from getting contaminated with ink even if the medium M comes into contact with the cover member 76.

Thus, with the second embodiment, it is possible to obtain the following effect.

(3) The support portion 70 includes the covering portion 81 configured to cover the upper side of the holding unit 78 or the roll body 77 that constitute the cover unit 75. It is possible to suppress attachment of ink during printing, on the holding unit 78 or the roll body 77.

Third Embodiment

Next, with reference to FIG. 9, description will be made of the configurations of the support portion 70 and the cover unit 75 according to a third embodiment.

Figure 9:
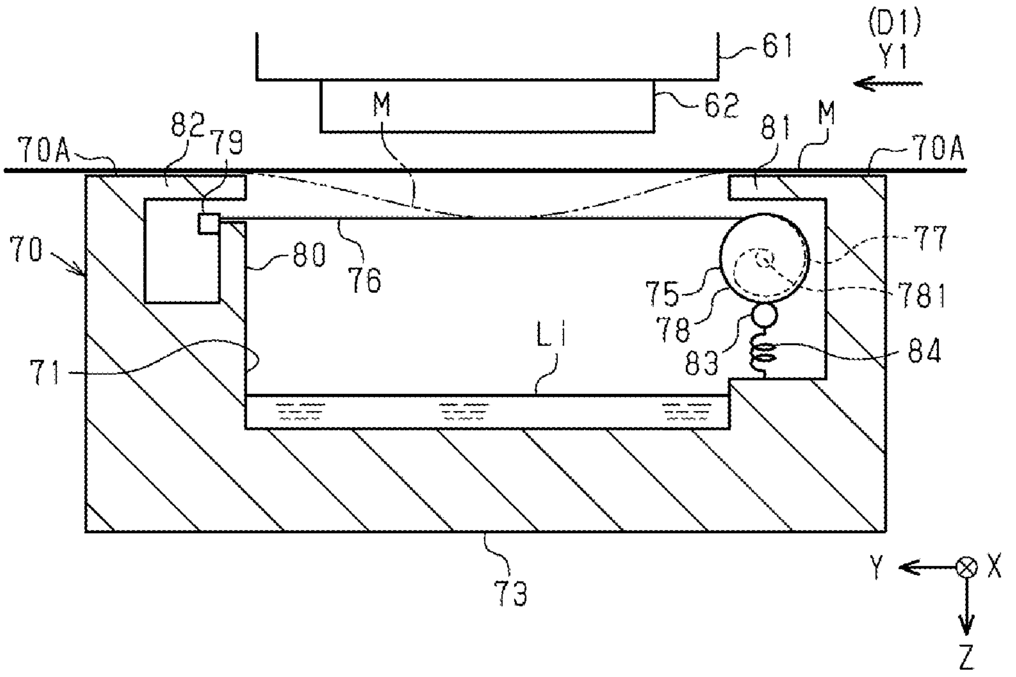
FIG. 9 is a side cross-sectional view schematically illustrating a support portion and a cover unit according to a third embodiment.

As illustrated in FIG. 9, the cover unit 75 includes a pressing portion 83 configured to press the outer peripheral surface of the roll body 77. The cover unit 75 includes an elastic member 84 configured to bias the pressing portion 83. The pressing portion 83 presses the outer peripheral surface of the roll body 77 with elastic force of the elastic member 84. The pressing portion 83 is supported through the elastic member 84 relative to the inner wall portion of the support portion 70. With this configuration, the pressing portion 83 is provided displaceably in the radial direction of the roll body 77 in a state of being biased in a direction toward the roll body 77. This enables the pressing portion 83 to maintain the state of pressing the outer peripheral surface of the roll body 77 even if the diameter of winding of the roll body 77 changes.

When pulling out the cover member 76, a user pulls out the cover member 76 from the roll body 77 by resisting friction resistance between the pressing portion 83 and the roll body 77. Thus, even when a user excessively applies force to pull out the cover member 76, the pulling-out velocity for the cover member 76 is limited to an appropriate velocity. This enables the user to pull out the cover member 76 in a smooth manner. For example, when the roll body 77 is rotated at a fast speed, there is a possibility that ink attached on the roll body 77 is scattered over the surroundings with excessive centrifugal force. However, the cover member 76 is limited to an appropriate pulling-out velocity, which makes it possible to suppress scattering of ink from the roll body 77 over the surroundings at the time of pulling out.

Furthermore, with force of the pressing portion 83 pressing the roll body 77, it is possible to squeeze or scrape off the ink attached on the roll body 77 at the time of rotating the roll body 77. This makes it possible to suppress solidification of the ink attached on the cover member 76 as it is. When the ink attached on the cover member 76 wound into the roll body 77 is solidified, there is a possibility that the cover member 76 cannot be pulled out. However, as the pressing portion 83 removes ink from the cover member 76 in the process of pulling out or winding up the cover member 76, a problem concerning an operation of pulling out the cover member 76 is less likely to occur even if the ink attached on the cover member 76 is solidified.

Thus, with the third embodiment, it is possible to obtain the following effect.

(4) The liquid ejecting device 11 includes the pressing portion 83 configured to press the outer peripheral surface of the roll body 77. With this configuration, by using the pressing portion 83, it is possible to suppress pulling out of the cover member 76 with abrupt force.

Fourth Embodiment

Next, with reference to FIG. 10, description will be made of the configurations of the support portion 70 and the cover unit 75 according to a fourth embodiment.

Figure 10:
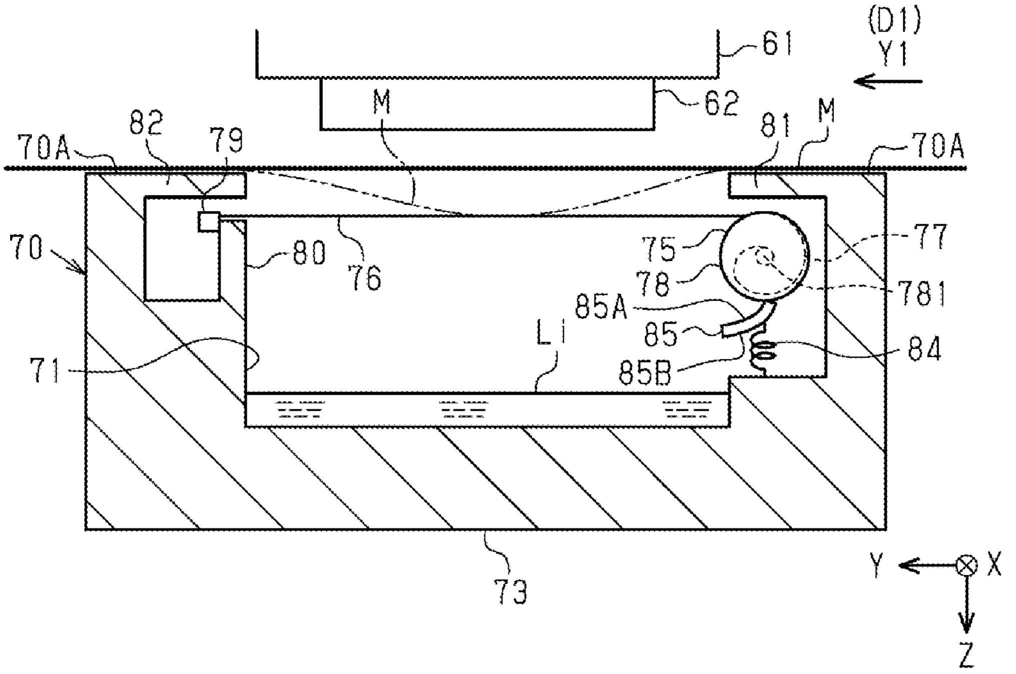
FIG. 10 is a side cross-sectional view schematically illustrating a support portion and a cover unit according to a fourth embodiment.

The cover unit 75 illustrated in FIG. 10 includes a cleaning unit 85 configured to come into contact with the outer peripheral surface of the roll body 77 to clean the cover member 76. The cleaning unit 85 has shape suitable for the cleaning function of squeezing or scraping the ink from the roll body 77. The cleaning unit 85 also functions as one example of a pressing portion, as in the third embodiment. The cleaning unit 85 has, for example, a blade shape. One end portion (tip portion) of the cleaning unit 85 has a shape suitable for squeezing off or scraping off the ink from the roll body 77. The other end of the cleaning unit 85 is located above the liquid receiving groove 71 in the vertical direction Z. The cleaning unit 85 has a width that makes it possible to press the entire region of the roll body 77 in the width direction X, and is comprised of a plate member having a slightly curved shape protruding downward. The other end portion (base end portion) of the cleaning unit 85 is located below the one end portion (tip portion) in the vertical direction Z.

In addition, the cleaning unit 85 presses the roll body 77 with elastic force of the elastic member 84, as with the pressing portion 83 illustrated in FIG. 9. That is, the cleaning unit 85 is supported through the elastic member 84 relative to the inner wall portion of the support portion 70. With this configuration, the cleaning unit 85 is provided displaceably in the radial direction of the roll body 77 in a state of being biased in a direction toward the roll body 77. This enables the cleaning unit 85 to maintain the pressing state even if the diameter of winding of the roll body 77 changes.

The cleaning unit 85 includes guide plates 85A and 85B provided at the upper surface and the lower surface thereof and configured to guide, to the liquid receiving groove 71, ink squeezed off from the roll body 77 or ink scraped off. In the example illustrated in FIG. 10, the upper surface of the cleaning unit 85 serves as the first guide plate 85A and the lower surface of the cleaning unit 85 serves as the second guide plate 85B.

In the process of pulling out the cover member 76 from the roll body 77, the cleaning unit 85 is pressed against the outer peripheral surface of the roll body 77 with the biasing force of the elastic member 84. With the cleaning unit 85, the ink is squeezed off or scraped off from the roll body 77. As this ink flows above the first guide plate 85A, this ink is guided to the liquid receiving groove 71. In addition, in the process in which the cover member 76 is wound around the roll body 77, the cleaning unit 85 is pressed against the outer peripheral surface of the roll body 77 with the biasing force of the elastic member 84, thereby squeezing off or scraping off the ink from the roll body 77. This ink flows along the second guide plate 85B, and is guided to the liquid receiving groove 71. Thus, it is possible to reliably guide the ink squeezed off or scraped off from the roll body 77 by the cleaning unit 85, to the liquid receiving groove 71.

Thus, with the fourth embodiment, it is possible to obtain the following effect.

(5) The cleaning unit 85 configured to come into contact with the outer peripheral surface of the roll body 77 to clean the cover member 76 is provided. With this configuration, using the cleaning unit 85, it is possible to clean the cover member 76. It is possible to reduce an error in printing resulting from contamination due to transfer of ink to the medium M that may happen when the medium M is supported by the cover member 76 in a state in which the cover member 76 is contaminated with ink.

Fifth Embodiment

Next, a fifth embodiment will be described with reference to FIGS. 11 and 12. In the fifth embodiment, the cover member 76 is pulled out and wound up with power of a driving source. The cover unit 75 includes a motor 92 serving as one example of a driving source configured to output power used to pull out and wind up the cover member 76. Below, description will be made of two embodiments employing different systems for operating the cover member 76 with a driving force of the motor 92. The fifth embodiment illustrated in FIGS. 11 and 12 employs the system in which the roll body 77 is rotated with the driving force of the motor 92.

Figure 11:
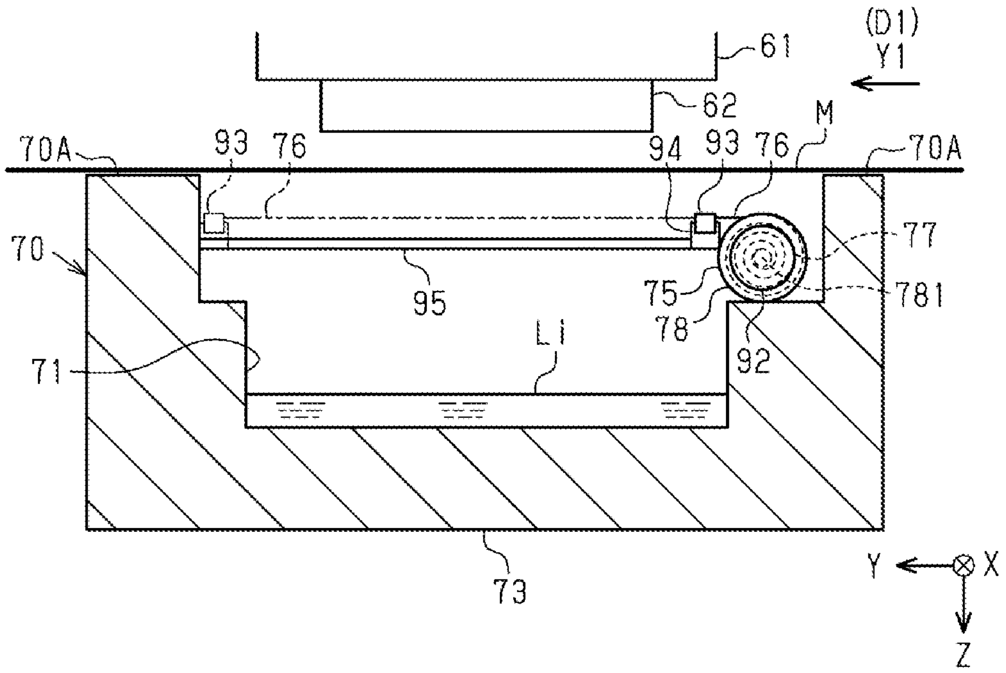
FIG. 11 is a side cross-sectional view schematically illustrating a support portion and a cover unit according to a fifth embodiment.
Figure 12:
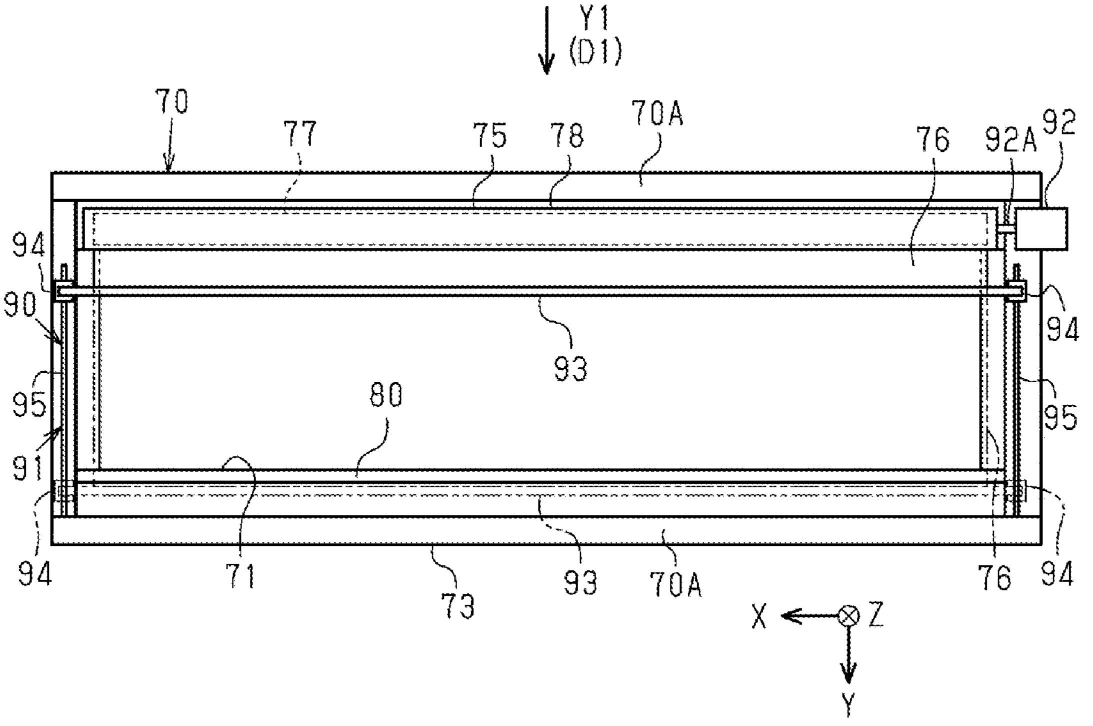
FIG. 12 is a schematic plan view illustrating the support portion and the cover unit according to the fifth embodiment.

As illustrated in FIGS. 11 and 12, the cover unit 75 includes the motor 92 serving as one example of a driving unit configured to apply a driving force to the rotary shaft 781 of the holding unit 78. An output shaft 92A of the motor 92 is coupled to one end portion of the rotary shaft 781. The cover unit 75 includes a driving unit 90 configured to guide the cover member 76 in an open-close direction. The driving unit 90 includes a movement unit 91 and the motor 92 described above. The movement unit 91 includes a guide rod 93, a pair of movable units 94, and a pair of rails 95.

The guide rod 93 is fixed at the tip portion of the cover member 76 in place of the handle 79 in each of the embodiments described above. The pair of movable units 94 are fixed at both end portions, in the width direction X, of the guide rod 93. The pair of rails 95 are provided so as to extend in the transport direction Y1 at the upper surface of each of both side portions of the support portion 70 with the liquid receiving groove 71 being interposed between these side portions in the width direction X. The pair of movable units 94 engage with the pair of rails 95, and are configured to reciprocate in the transport direction Y1 along the rail 95. The cover member 76 is made of such a material and in such a form as to have enough tension for the tip portion of the cover member 76 to move downstream in the transport direction Y1 without much bending when being fed from the roll body 77. The cover member 76 is constituted by, for example, mesh woven with a wire or resin fiber. For example, when the cover member 76 is made of cloth having high flexibility, the cover member 76 is bent at the time of being fed from the roll body 77. This makes it impossible to move the tip end of the cover member 76 downstream in the transport direction Y1. When the cover member 76 is made of mesh or the like having higher rigidity than cloth, it is possible to move the tip portion of the cover member 76 downstream in the transport direction Y1 due to feeding from the roll body 77.

As the control unit 100 causes the motor 92 to drive in a forward direction, the rotary shaft 781 rotates in a forward direction to cause the roll body 77 to rotate in a forward direction. This causes the cover member 76 to be sent out from the roll body 77. Thus, the cover member 76 moves from the open position illustrated by the solid line in FIG. 12 to the closed position illustrated by the long dashed double-short dashed line in FIG. 12.

In addition, as the control unit 100 causes the motor 92 to rotate in a rearward direction, the rotary shaft 781 rotates in a rearward to cause the roll body 77 to rotate in a rearward direction. This makes the cover member 76 wound around the roll body 77. Thus, the cover member 76 moves from the closed position illustrated by the long dashed double-short dashed line in FIG. 12 to the open position illustrated by the solid line in FIG. 12.

Thus, with the fifth embodiment, it is possible to obtain the following effect.

(6) The liquid ejecting device 11 includes: the holding unit 78 rotatably holding the roll body 77; the movement unit 91 configured to move the tip portion of the cover member 76 pulled out from the roll body 77 held by the holding unit 78; and the motor 92 serving as one example of a driving unit configured to apply a driving force to the rotary shaft 781 of the holding unit 78. The motor 92 applies, to the rotary shaft 781, a driving force used to pull out and wind up the cover member 76. With this configuration, the motor 92 applies, to the rotary shaft 781, a rotational driving force (torque) used to pull out and wind up the cover member 76, which makes it possible to automate opening and closing of the cover member 76. For example, this makes it possible to eliminate the cumbersome operation performed by a user to manually open and close the cover member 76 having a wide width, and it is possible to suppress pulling out of the cover member 76 with abrupt force, which can occur in a case of manual operation.

Sixth Embodiment

Next, a sixth embodiment will be described with reference to FIG. 13. The cover unit 75 includes the motor 92 serving as one example of a driving source configured to output power used to pull out and wind up the cover member 76. The cover unit 75 according to the sixth embodiment employs a system in which the driving force of the motor 92 is applied to the movement unit 91 to move the tip portion of the cover member 76.

Figure 13:
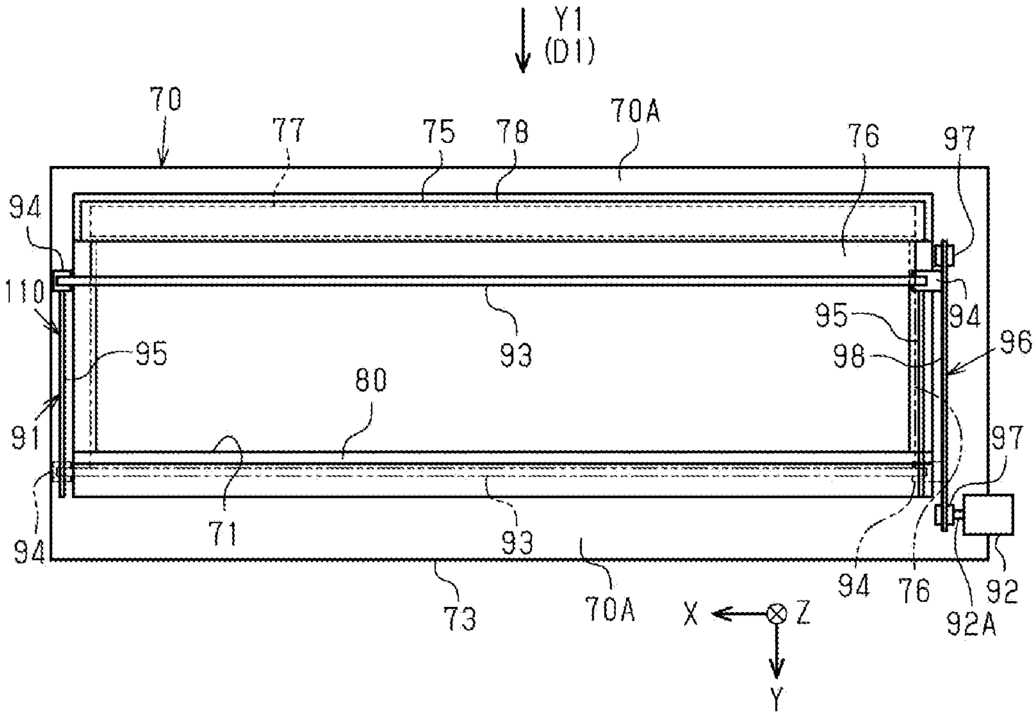
FIG. 13 is a schematic plan view illustrating a support portion and a cover unit according to a sixth embodiment.

As illustrated in FIG. 13, the cover unit 75 includes the motor 92 and the driving unit 110. The driving unit 110 according to the present embodiment includes the movement unit 91 and a power transmission mechanism 96 configured to transmit the driving force of the motor 92 to the movement unit 91. The movement unit 91 has a configuration basically similar to that in the fifth embodiment. That is, the movement unit 91 includes the guide rod 93, the pair of movable units 94, and the pair of rails 95.

The power transmission mechanism 96 includes a pair of pulleys 97 and a timing belt 98 looped around the pair of pulleys 97. One of the movable units 94 is fixed at a portion of the timing belt 98. Furthermore, the other one of the pulleys 97 is coupled to the output shaft 92A of the motor 92.

As the control unit 100 causes the motor 92 to rotate in the forward direction, the pair of movable units 94 move downstream along the pair of rails 95 in the transport direction Y1. This causes the guide rod 93 to move downstream in the transport direction Y1. Thus, the cover member 76 moves from the open position illustrated by the solid line in FIG. 13 to the closed position illustrated by the long dashed double-short dashed line in FIG. 13.

In addition, as the control unit 100 causes the motor 92 to rotate in the rearward direction, the pair of movable units 94 move upstream along the pair of rails 95 in the transport direction Y1. This causes the guide rod 93 to move upstream in the transport direction Y1. At this time, the rotary shaft 781 is biased in the winding direction with elastic force of a spring such as a mainspring (not illustrated) within the holding unit 78. Thus, the cover member 76 moves from the closed position illustrated by the long dashed double-short dashed line in FIG. 13 to the open position illustrated by the solid line in FIG. 13.

Thus, with the sixth embodiment, it is possible to obtain the following effect.

(7) The liquid ejecting device 11 includes: the holding unit 78 rotatably holding the roll body 77; the movement unit 91 configured to move the tip portion of the cover member 76 pulled out from the roll body 77 held by the holding unit 78; and the motor 92 serving as one example of a driving unit configured to apply a driving force to the movement unit 91. The motor 92 applies, to the movement unit 91, a driving force used to pull out and wind up the cover member 76. With this configuration, the motor 92 applies, to the movement unit 91, the driving force used to move in order to pull out and wind up the cover member 76, which makes it possible to automate opening and closing of the cover member 76. For example, this makes it possible to eliminate the cumbersome operation performed by a user to manually open and close the cover member 76 having a wide width, and it is possible to suppress pulling out of the cover member 76 with abrupt force, which can occur in a case of manual operation.

Seventh Embodiment

Next, a seventh embodiment will be described with reference to FIG. 14. The seventh embodiment provides an example in which the cover member 76 is divided into a plurality of pieces.

Figure 14:
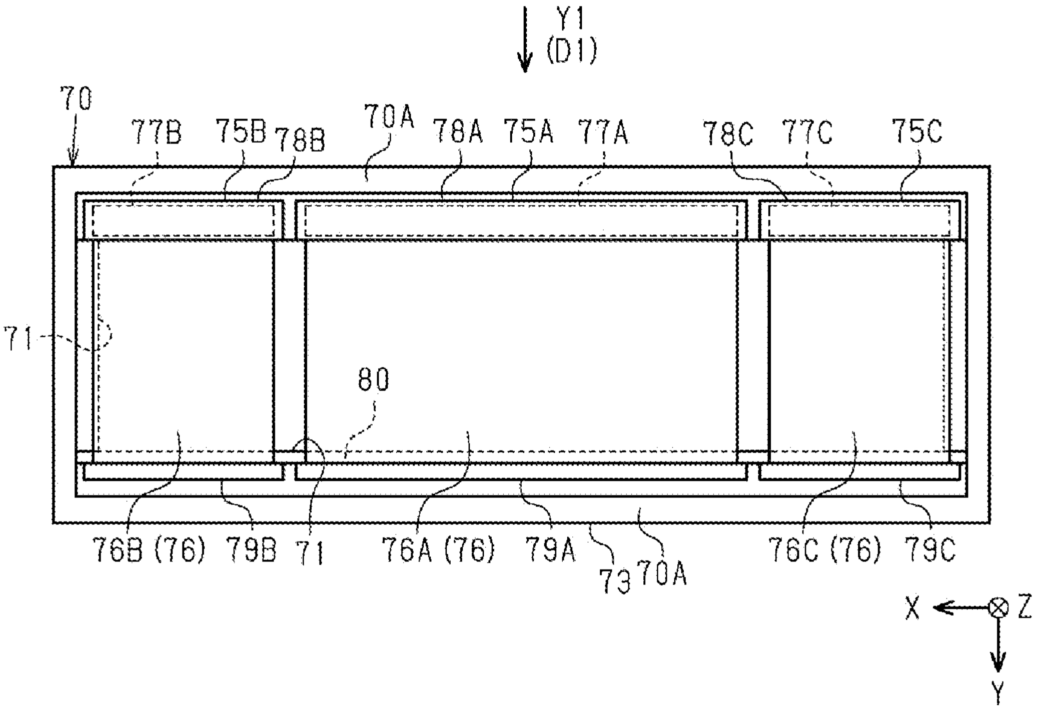
FIG. 14 is a schematic plan view illustrating a cover unit divided into a plurality of pieces according to a seventh embodiment.

As illustrated in FIG. 14, the cover member 76 May be divided in the width direction X of the medium M. When the number of divisions is N, the cover member 76 is divided into N pieces in the width direction X, where the N represents a natural number not less than 2. In the example illustrated in FIG. 14, the N is three. That is, in the width direction X, the cover member 76 is divided into three cover members 76A to 76C. However, the number of divisions is not limited to three, and the number of divisions N may be set to any necessary number. For example, the number of divisions N may be two, four, five, six, or more.

The support portion 70 is provided with N pieces of cover units 75A to 75C, the number of which is equal to the number of cover members 76A to 76C that are divided into N pieces. In this example in which the cover member 76 is divided into three pieces, the support portion 70 includes three cover units 75A to 75C. The three cover units 75A to 75C can individually pull out the cover members 76A to 76C, and can also individually wind up the cover members 76A to 76C. The configurations of the plurality of cover units 75A to 75C are basically similar to the configuration of the cover unit 75 according to a first embodiment. That is, the cover unit 75A includes a roll body 77A wound with a first cover member 76A, and a holding unit 78A rotatably holding the roll body 77A. In addition, the cover unit 75B includes a roll body 77B wound with a second cover member 76B, and a holding unit 78B rotatably holding the roll body 77B. Furthermore, the cover unit 75C includes a roll body 77C wound with a third cover member 76C, and a holding unit 78C rotatably holding the roll body 77C. The cover members 76A to 76C each include a handle 79A to 79C fixed at the tip portion thereof.

In the example illustrated in FIG. 14, the first cover member 76A located at the center in the width direction X has the widest width. In addition, the second cover member 76B and the third cover member 76C are disposed at corresponding sides, in the width direction X, of the first cover member 76A. Each of the width dimensions of the second cover member 76B and the third cover member 76C is set narrower than the width dimension of the first cover member 76A.

For example, the width dimension of the first cover member 76A may be set to match the width dimension of the medium M having the maximum width. The first cover member 76A may be positioned in the width direction X such that the center line of the width of the first cover member 76A matches the center line of the width of the medium M transported above the support portion 70. In this case, the region where the first cover member 76A is disposed when being pulled out overlaps with the transport region of the medium M. That is, this makes it possible to dispose the first cover member 76A over substantially the entire region directly below the medium M even when the medium M has the maximum width size.

In a case of the medium M in which ink is more likely to permeate through to the back surface, the first cover member 76A is disposed at the open position, and the second cover member 76B and the third cover member 76C are disposed at the closed position. During printing, the carriage 61 moves in the scanning direction X. At this time, when airflow (wind) occurring due to wind pressure of the carriage 61 passes through the liquid receiving groove 71 and enters the back surface side of the medium M, the medium M flutters. When the medium M flutters (trembles) during printing, the landing position of droplets of ink ejected from the nozzle 62N of the ejecting unit 62 is shifted from the targeted position, which leads to a deterioration in accuracy in printing.

As a method of suppressing this type of fluttering of the medium M, the second cover member 76B and the third cover member 76C are disposed at the closed position. The first cover member 76A may be disposed at the closed position or the open position, whichever is possible. In a case of the medium M in which ink is more likely to permeate through to the back surface, the first cover member 76A is disposed at the open position. In a case of the medium M in which ink is less likely to permeate through to the back surface, the first cover member 76A is disposed at the closed position.

During printing, the carriage 61 moves in the scanning direction X. At this time, the airflow (wind) occurring due to wind pressure of the carriage 61 is blocked by the second cover member 76B and the third cover member 76C that are at the closed position, and its entrance into the liquid receiving groove 71 is suppressed. This makes it possible to suppress entrance of the airflow into the back surface side of the medium M to cause the medium M to flutter. As fluttering of the medium M is suppressed, the landing position of droplets (ink droplets) ejected from the nozzle 62N of the ejecting unit 62 is less likely to be shifted from the targeted position. This makes it possible to suppress a deterioration in accuracy of printing resulting from fluttering of the medium M. Thus, it is possible to perform printing on the medium M with high printing quality.

Furthermore, the material of the plurality of cover members 76A to 76C may vary depending on the location thereof in the width direction X. For example, by making the first cover member 76A at the center using a material (mesh or the like) without a dense structure, when ink is permeated through the medium M to the back surface, the ink is dropped into the liquid receiving groove 71 even in a state in which the first cover member 76A closes the liquid receiving groove 71.

The cover members 76B and 76C at both sides may be made of a material with a dense structure. With this configuration, by disposing the cover members 76B and 76C at the closed position, it is possible to suppress fluttering of the medium M that occurs as an airflow, generated from the wind pressure of the carriage 61 at the time when carriage 61 moves in the scanning direction X, passes through the inside of the liquid receiving groove 71 and travels around to the back side of the medium M. This makes it possible to perform printing on the medium M with high printing quality.

Thus, with the seventh embodiment, it is possible to obtain the following effect.

(8) The cover member 76 is divided in the width direction X of the medium M. With this configuration, selectively pulling out from the roll body 77 a cover member corresponding to a region including the liquid receiving groove 71 desired to be covered from among the plurality of cover members 76A to 76C that are divided makes it possible to partially cover the opening of the liquid receiving groove 71. For example, in a case of the serial-type liquid ejecting device 11, it is possible to suppress fluttering of the medium M that occurs as an airflow, generated from the wind pressure at the time when the carriage 61 moves, passes through the liquid receiving groove 71 and travels around to the back side of the medium M. Thus, it is possible to perform printing on the medium M with high printing quality.

Eighth Embodiment

Next, an eighth embodiment will be described with reference to FIG. 15. The eighth embodiment provides an example in which the cover member 76 includes a heater 86.

Figure 15:
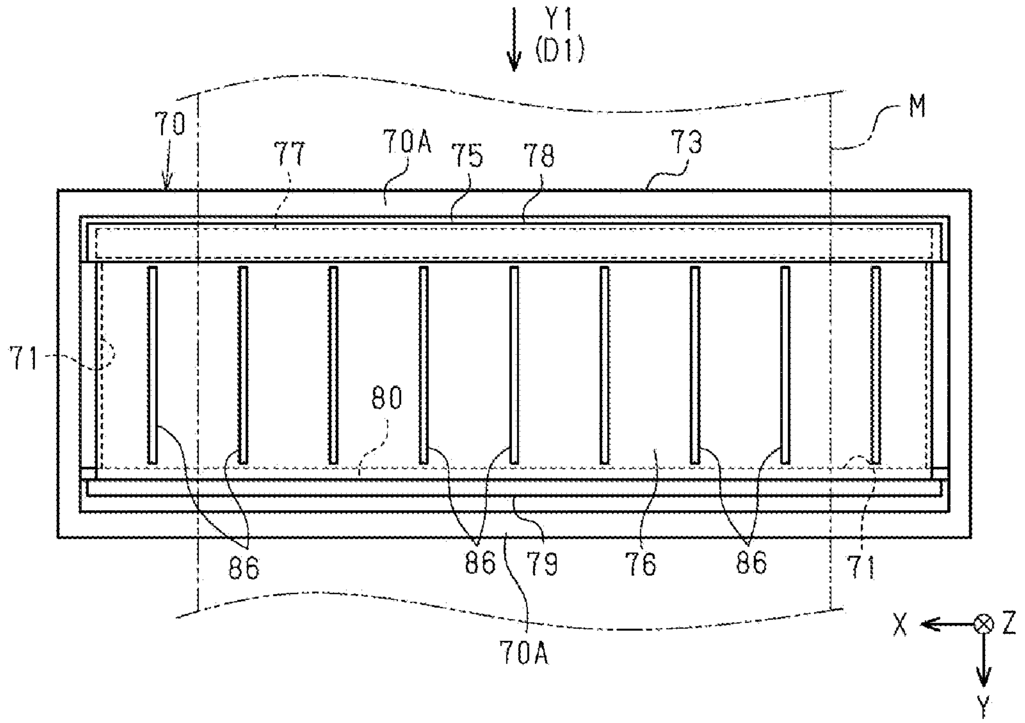
FIG. 15 is a schematic plan view illustrating a cover unit including a heater according to an eighth embodiment.

As illustrated in FIG. 15, the cover member 76 includes the heater 86. In the example illustrated in FIG. 15, a plurality of the heaters 86 having a line shape extending in the transport direction Y1 are disposed at intervals in the width direction X. Note that the heater 86 May have any shape. For example, the heater 86 May be constituted by a heater line extending in a spiral shape at the front surface or the back surface of the cover member 76, or may be constituted by a heater line having a wire shape in which a plurality of crank-shaped wiring portions are repeated. The heater line may be disposed uniformly in a region of the cover member 76 opposed to the medium M. In addition, the density of wiring lines of the heater 86 May vary depending on locations such that the density of the heater 86 at the central portion in the width direction X is denser than that at both end portions. By setting the density of wiring lines of the heater 86 so as to be uniform or so as to be denser at the central portion in this manner, it is possible to uniformly dry the ink attached on the medium M.

The control unit 100 determines whether the printing condition is set such that ink is less likely to dry, based on printing condition information or print data. When determining that the printing condition is set such that ink is less likely to dry, the control unit 100 may energize the heater 86 to heat the medium M during printing. In addition, the control unit 100 may control a heating temperature of the heater 86 based on a type of the medium M or other printing condition information. For example, when the medium M (fabric) is made of fiber vulnerable to heat, the control unit 100 may reduce a heating temperature of the heater 86, and when the medium M is made of fiber strong to heat, the control unit 100 may increase a heating temperature of the heater 86. Here, it may be possible to employ a configuration of acquiring a printing duty based on print data to control the heater 86 in accordance with the printing duty. Note that the printing duty represents a numerical value (%) expressed as a ratio of the amount of ejection of ink from the ejecting unit 62 per unit area of the medium M with the maximum value being 100%.

In addition, the control unit 100 may always energize all the heaters 86 of the cover member 76 to heat the medium M. Furthermore, the control unit 100 may selectively energize the heater 86 located within a region of the medium M in the width direction X of the cover member 76 to heat the medium M. With this configuration, by using the heater 86 to heat only the region necessary to heat the medium M, it is possible to achieve both effective drying by heat and a reduction in power consumption.

Thus, with the eighth embodiment, it is possible to obtain the following effect.

(9) The cover member 76 includes the heater 86 configured to heat the medium M. With this configuration, when the cover member 76 is at the closed position, it is possible to accelerate drying of a liquid such as ink ejected to the medium M by heat of the heater 86 provided at the cover member 76 disposed at the opposite side from the ejecting unit 62 with respect to the medium M.

Ninth Embodiment

Figure 16:
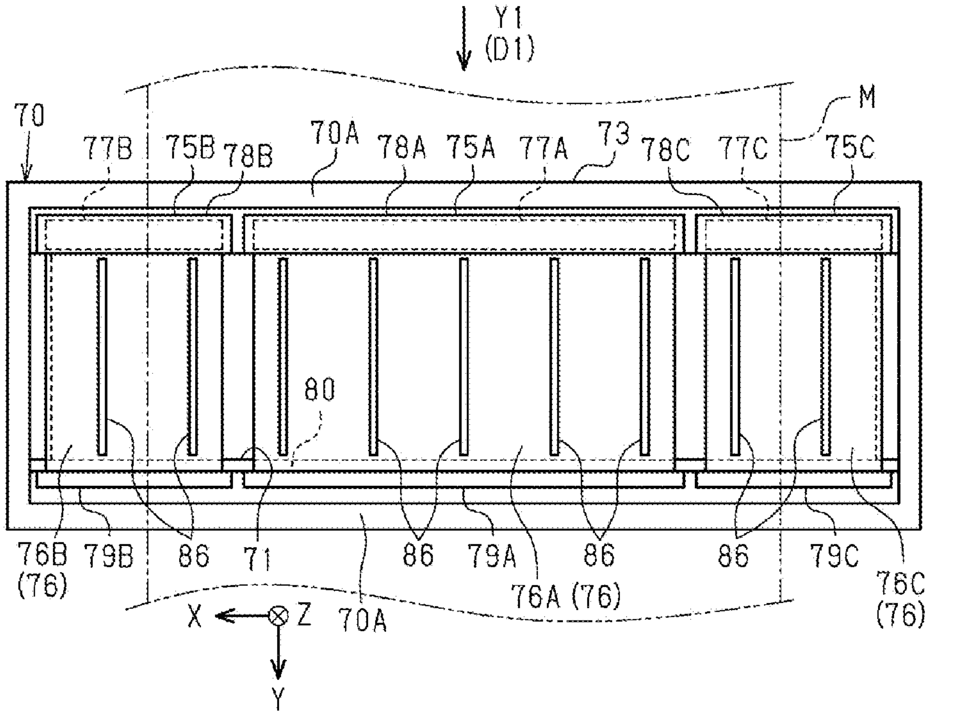
FIG. 16 is a schematic plan view illustrating a division-type cover unit including a heater according to a ninth embodiment.

Next, a ninth embodiment will be described with reference to FIG. 16. The ninth embodiment provides an example in which the heater 86 is provided at the division-type cover members 76A to 76C described in the seventh embodiment. As illustrated in FIG. 16, the heater 86 is provided at the division-type cover members 76A to 76C such that the density of wiring lines per unit area is uniform. In the example illustrated in FIG. 16, the heater 86 is disposed at substantially equal intervals in the width direction X. The shape of the wiring line of the heater 86 May be a spiral shape or zig-zag form. In the example illustrated in FIG. 16, the cover member 76 is divided into three cover members 76A to 76C in the width direction X. However, the number of divisions N may be set to any necessary number including two, four, five, six, or more, as in the seventh embodiment.

The heater 86 can be switched on or off for each of the divided cover members 76A to 76C. By switching on the heater 86 that overlaps with the medium M in the width direction X, the control unit 100 causes ink landing on the medium M to dry. In addition, by switching off the heater 86 not overlapping with the medium M, the control unit 100 suppresses hitting of heat against the nozzle surface 62A of the ejecting unit 62.

Thus, with the ninth embodiment, it is possible to obtain the following effect.

(9) The divided cover members 76A to 76C include the heater 86 configured to heat the medium M. With this configuration, it is possible to accelerate drying of the medium M on which ink is ejected from the ejecting unit 62. In addition, selectively pulling out any of the plurality of divided cover members 76A, 76B, and 76C makes it possible to partially cover the opening of the liquid receiving groove 71. For example, in a case of the serial-type liquid ejecting device 11, it is possible to suppress fluttering of the medium M that occurs as a result of the wind pressure at the time when the carriage 61 moves.

Note that the embodiments described above can be modified as in the following modification examples. Furthermore, an example obtained by combining the above-described embodiments and any of the modification examples described below on an as-necessary basis can be used as a further modified example, and an example obtained by combining the modification examples described below with each other on an as-necessary basis can be used as a further modified example.

Figure 17:
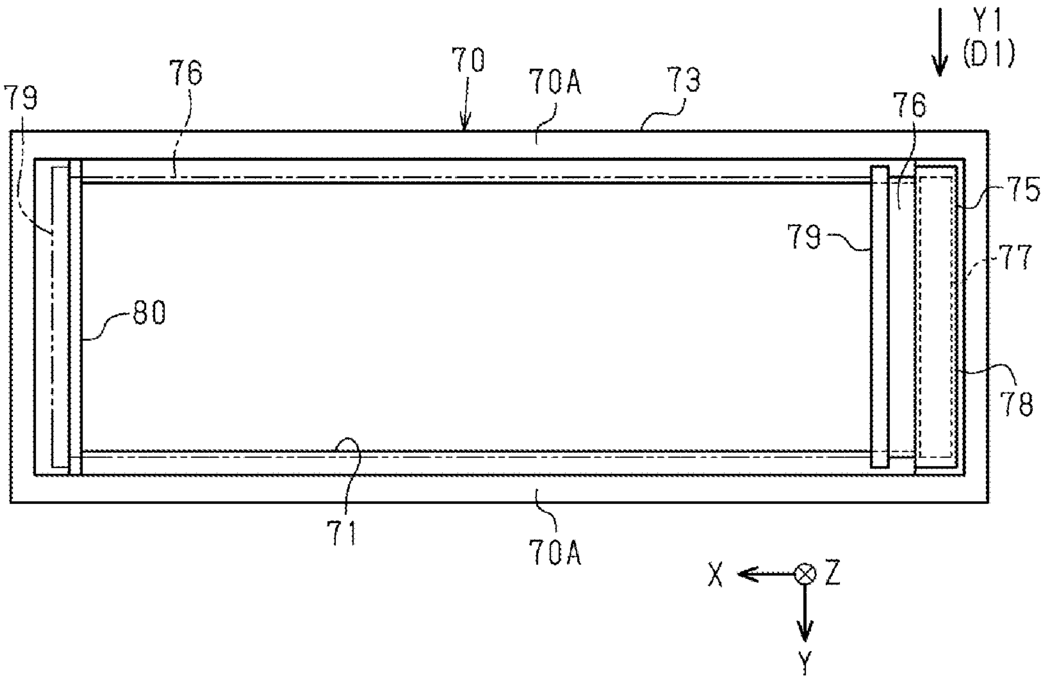
FIG. 17 is a schematic plan view illustrating a support portion and a cover unit according to a modification example.

As illustrated in FIG. 17, the cover member 76 May be pulled out and wound up in the width direction X. The cover unit 75 is disposed at one side, in the width direction X, of the support portion 70. By holding the handle 79 to pull out the cover member 76 from the roll body 77 in the width direction X, it is possible to switch from the open position illustrated by the solid line FIG. 17 at which the opening of the liquid receiving groove 71 is opened into the closed position illustrated by the long dashed double-short dashed line in FIG. 17 at which the opening of the liquid receiving groove 71 is closed. At the closed position, the handle 79 is hooked on the engagement target portion 80 or the recessed portion 72 (see FIGS. 5 and 6). Note that, in this configuration, there may be employed a configuration in which the pressing portion 83 is provided, a configuration in which the cleaning unit 85 is provided, a configuration in which the motor 92 serving as one example of a driving unit configured to open and close the cover member 76, a configuration in which the cover member 76 is divided into a plurality of pieces in the width direction X, and a configuration in which the cover member 76 includes the heater 86. Furthermore, it may be possible to employ a configuration obtained by combining at least two configurations of these configuration.

Figure 18:
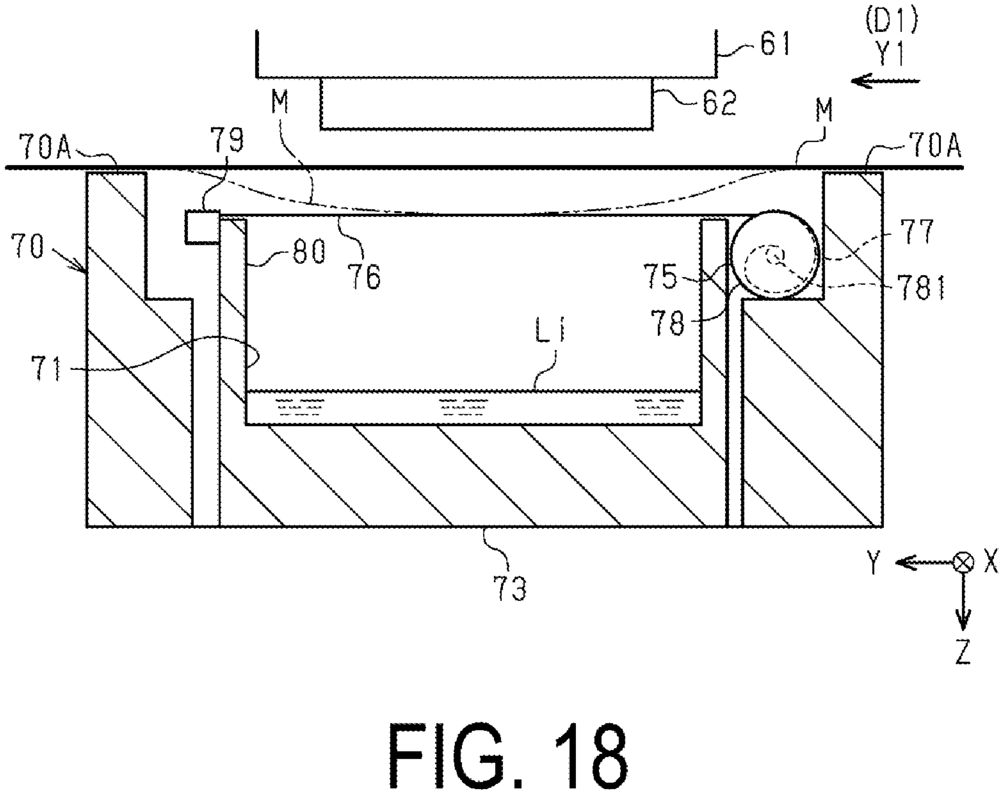

As illustrated in FIG. 18, the liquid receiving section 73 may be provided separately from the support portion 70 configured to support the medium M. For example, the liquid receiving section 73 may be a tray detachable from a frame that constitutes the base 12. Furthermore, as illustrated in FIG. 18, the holding unit 78 holding the roll body 77 May be disposed outside of the liquid receiving section 73. In this case, the holding unit 78 does not prevent attachment or detachment of the liquid receiving section 73.

In each of the embodiments illustrated in FIGS. 14 and 16, the cover members 76A to 76C may have different friction coefficients. By varying the friction coefficients depending on locations where the cover members 76A to 76C are disposed, it is possible to improve the accuracy of transportation and variation in tension. For example, the friction coefficient, relative to the medium M, of the cover member 76A located at the center in the width direction X is set to be larger than or smaller than the friction coefficients, relative to the medium M, of the cover members 76B and 76C at both sides with the cover member 76A being interposed between them in the width direction X. The friction coefficients of the cover members 76B and 76C at both sides may be equal to each other or may differ from each other.

The roll body 77 and the holding unit 78 May be disposed downstream of the liquid receiving groove 71 in the transport direction Y1. In this case, the cover member 76 is pulled out toward the upstream in the transport direction Y1, and is wound when moved downstream in the transport direction Y1.

In each of the embodiments illustrated in FIGS. 14 and 16, each of the plurality of cover units 75A to 75C includes the motor 92 serving as one example of a driving unit. Each of the cover units 75A to 75C may be configured such that the driving force of the motor 92 is applied to the rotary shaft 781, as illustrated in FIGS. 11 and 12. In addition, each of the cover units 75A to 75C may be configured such that the driving force of the motor 92 is applied to the movement unit 91, as illustrated in FIG. 13.

The cleaning unit 85 illustrated in FIG. 10 May be configured such that a portion other than the outer peripheral surface of the roll body 77 comes into contact with the cover member 76 to clean the cover member 76. For example, at or around the drawing slit 784, the cleaning unit 85 May come into contact with a portion of the cover member 76 that is pulled out from the drawing slit 784. In addition, the cleaning unit 85 may not include the function of the pressing portion. In this case, the liquid ejecting device 11 may include the cleaning unit 85 and the pressing portion 83 separately.

The holding unit 78 of the cover unit 75 May include a ratchet mechanism. The ratchet mechanism is configured to enable an operation of pulling out the cover member 76 and restrict an operation of winding the cover member 76 by a spring such as a mainspring. With this configuration, it is possible to stop the cover member 76 at a given location in the pulling-out direction. For example, as with the cover unit 75 illustrated in FIGS. 5 and 6, it is possible to dispose the cover member 76 at the closed position at which a portion of the opening of the liquid receiving groove 71 is closed, and in addition, there is no need to provide the recessed portion 72 or the engagement target portion 80.

Rather than the motor 92, the driving unit may be a cylinder. For example, the cylinder may include an electrically powered cylinder, a pneumatic cylinder, or a hydraulic cylinder.

While the cover member 76 is biased in the winding direction of the roll body 77 using a spring such as a mainspring, it may be possible to perform winding in a manual manner. For example, a rotary-type handle is provided at a side portion of the holding unit 78. It may be possible to employ a configuration in which a user performs rotating operation of the handle to wind the cover member 76 into the roll body 77.

The medium M is not limited to a fabric such as cloth or a non-woven fabric, and it may be possible to use a sheet, a film made of synthetic resin, a laminated medium, or the like.

The liquid ejecting device 11 is not limited to the textile printing device, and it may be possible to use an ink-jet printing apparatus (printer) configured to perform printing on a sheet. For example, when printing is performed on paper with a relatively large gap between fibers in the paper or on paper having high ink permeability, or when printing is performed such that a large amount of ink is ejected onto paper, it may be possible to employ a configuration in which a gutter-platen type printing apparatus includes the support portion 70 including the liquid receiving groove 71. In addition, in this type of printing apparatus, it may be possible to employ a winding-type cover unit 75 for the purpose of covering a portion or all of the opening of the liquid receiving groove 71.

Below, description will be made of technical concepts together with effects understood from the embodiments and the modification examples described above.

(A) A liquid ejecting device includes: an ejecting unit configured to eject a liquid to a medium; a liquid receiving section including a liquid receiving groove opposed to the ejecting unit; and a roll body wound with a cover member having flexibility, in which the cover member is configured to be displaced, by being pulled out from the roll body, to a closed position to close an opening of the liquid receiving groove, and is configured to be displaced, by being wound around the roll body, to an open position to open the opening of the liquid receiving groove.

In a case of the configuration in which the cover member droops with its own weight when disposed at the open position, deformation such as a fold is more likely to occur at the lower end portion of the cover member that droops. With this configuration, the cover member at the open position is wound into a roll form. This makes it possible to suppress occurrence of deformation such as a fold at the cover member, as compared with the configuration in which the cover member droops with its own weight.

(B) The liquid ejecting device according to (A) described above may include a pressing portion configured to press an outer peripheral surface of the roll body.

With this configuration, by using the pressing portion, it is possible to suppress pulling out of the cover member with abrupt force.

(C) The liquid ejecting device according to (A) or (B) described above may include a cleaning unit configured to come into contact with an outer peripheral surface of the roll body to clean the cover member.

With this configuration, it is possible to clean the cover member using the cleaning unit. It is possible to reduce an error in printing resulting from contamination due to transfer of a liquid to the medium that may happen when the medium is supported by the cover member in a state in which the cover member is contaminated with a liquid.

(D) The liquid ejecting device according to any one of (A) to (C) described above may further include: a holding unit rotatably holding the roll body; a movement unit configured to move a tip portion of the cover member pulled out from the roll body held by the holding unit; and a driving unit configured to apply a driving force to the movement unit or a rotary shaft of the holding unit, the driving force being used to pull out and wind up the cover member.

With this configuration, the driving unit applies, to the rotary shaft, rotational driving force (torque) used to pull out and wind up the cover member, or applies, to the movement unit, a driving force for movement to pull out and wind up the cover member. This makes it possible to automate opening and closing of the cover member. For example, this makes it possible to eliminate the cumbersome operation performed by a user to manually open and close the cover member having a wide width, and it is possible to suppress pulling out of the cover member with abrupt force, which can occur in a case of manual operation.

(E) In the liquid ejecting device according to any one of (A) to (D) described above, the cover member may be divided in a width direction of the medium.

With this configuration, selectively pulling out from the roll body a cover member corresponding to a region including the liquid receiving groove desired to be covered from among the plurality of cover members that are divided makes it possible to partially cover the opening of the liquid receiving groove. For example, in a case of the serial-type liquid ejecting device, it is possible to suppress fluttering of the medium that occurs as an airflow, generated from the wind pressure at the time when a carriage moves, passes through the liquid receiving groove and travels around to the back side of the medium. This makes it possible to perform printing on the medium with high printing quality.

(F) In the liquid ejecting device according to any one of (A) to (E) described above, the cover member may include a heater configured to heat the medium.

With this configuration, when the cover member is at the closed position, it is possible to accelerate drying of a liquid ejected to the medium by heat of the heater provided at the cover member disposed at the opposite side from the ejecting unit with respect to the medium.

(G) The liquid ejecting device according to any one of (A) to (F) described above may further include: a detector configured to detect a state of a front surface of the cover member; a notification unit; and a control unit configured to cause the notification unit to make a notification of the state of the front surface of the cover member based on a detection result by the detector.

In a case of this configuration, as a problem that can occur in a winding-type cover member, accumulation of dirt occurs due to the cover member being wound up in a state in which a liquid is attached and the cover member is contaminated. The detector configured to detect a state of the front surface of the cover member is provided, and when, based on a result of detection, it is found that dirt is accumulated, the notification unit is caused to make a notification of the accumulation of dirt. This makes it possible to prompt a user to perform maintenance (cleaning, replacement, or the like).

What is claimed is:

1. A liquid ejecting device comprising:

an ejecting unit configured to eject a liquid to a medium;

a liquid receiving section including a liquid receiving groove opposed to the ejecting unit;

a roll body wound with a cover member having flexibility, wherein the cover member that is configured to be displaced, by being pulled out from the roll body, to a closed position to close an opening of the liquid receiving groove, and is configured to be displaced, by being wound around the roll body, to an open position to open the opening of the liquid receiving groove; and a pressing portion configured to press an outer peripheral surface of the roll body.

2. The liquid ejecting device according to claim 1, further comprising a cleaning unit configured to come into contact with an outer peripheral surface of the roll body to clean the cover member.

3. The liquid ejecting device according to claim 1, further comprising:

a holding unit rotatably holding the roll body;

a movement unit configured to move a tip portion of the cover member pulled out from the roll body held by the holding unit; and a driving unit configured to apply a driving force to the movement unit or a rotary shaft of the holding unit, the driving force being used to pull out and wind up the cover member.

4. The liquid ejecting device according to claim 1, wherein the cover member is divided in a width direction of the medium.

5. The liquid ejecting device according to claim 1, wherein the cover member includes a heater configured to heat the medium.

6. The liquid ejecting device according to claim 1, further comprising:

a detector configured to detect a state of a front surface of the cover member;

a notification unit; and a control unit configured to cause the notification unit to make a notification of the state of the front surface of the cover member based on a detection result by the detector.

7. A liquid ejecting device comprising:

an ejecting unit configured to eject a liquid to a medium;

a liquid receiving section including a liquid receiving groove opposed to the ejecting unit; and a roll body wound with a cover member having flexibility, wherein the cover member that is configured to be displaced, by being pulled out from the roll body, to a closed position to close an opening of the liquid receiving groove, and is configured to be displaced, by being wound around the roll body, to an open position to open the opening of the liquid receiving groove; and a cleaning unit configured to come into contact with an outer peripheral surface of the roll body to clean the cover member.

8. The liquid ejecting device according to claim 7, further comprising a pressing portion configured to press an outer peripheral surface of the roll body.

9. The liquid ejecting device according to claim 7, further comprising:

a holding unit rotatably holding the roll body;

a movement unit configured to move a tip portion of the cover member pulled out from the roll body held by the holding unit; and a driving unit configured to apply a driving force to the movement unit or a rotary shaft of the holding unit, the driving force being used to pull out and wind up the cover member.

10. The liquid ejecting device according to claim 7, wherein the cover member is divided in a width direction of the medium.

11. The liquid ejecting device according to claim 7, wherein the cover member includes a heater configured to heat the medium.

12. The liquid ejecting device according to claim 7, further comprising:

a detector configured to detect a state of a front surface of the cover member;

a notification unit; and a control unit configured to cause the notification unit to make a notification of the state of the front surface of the cover member based on a detection result by the detector.

13. A liquid ejecting device comprising:

an ejecting unit configured to eject a liquid to a medium;

a liquid receiving section including a liquid receiving groove opposed to the ejecting unit; and a roll body wound with a cover member having flexibility, wherein the cover member that is configured to be displaced, by being pulled out from the roll body, to a closed position to close an opening of the liquid receiving groove, and is configured to be displaced, by being wound around the roll body, to an open position to open the opening of the liquid receiving groove, and wherein the cover member includes a heater configured to heat the medium.

14. The liquid ejecting device according to claim 13, further comprising a pressing portion configured to press an outer peripheral surface of the roll body.

15. The liquid ejecting device according to claim 13, further comprising a cleaning unit configured to come into contact with an outer peripheral surface of the roll body to clean the cover member.

16. The liquid ejecting device according to claim 13, further comprising:

a holding unit rotatably holding the roll body;

a movement unit configured to move a tip portion of the cover member pulled out from the roll body held by the holding unit; and a driving unit configured to apply a driving force to the movement unit or a rotary shaft of the holding unit, the driving force being used to pull out and wind up the cover member.

17. The liquid ejecting device according to claim 13, wherein the cover member is divided in a width direction of the medium.

18. The liquid ejecting device according to claim 13, further comprising:

a detector configured to detect a state of a front surface of the cover member;

a notification unit; and a control unit configured to cause the notification unit to make a notification of the state of the front surface of the cover member based on a detection result by the detector.

* * * * *